(12) United States Patent
Ebersole et al.

(10) Patent No.: US 6,578,017 B1
(45) Date of Patent: Jun. 10, 2003

(54) METHOD TO AID OBJECT DETECTION IN IMAGES BY INCORPORATING CONTEXTUAL INFORMATION

(75) Inventors: John Franklin Ebersole, Bedford, NH (US); John Franklin Ebersole, Jr., Bedford, OH (US)

(73) Assignee: Information Decision Technologies, LLC, Bedford, NH (US)

( * ) Notice: Subject to any disclaimer, the term of this patent is extended or adjusted under 35 U.S.C. 154(b) by 0 days.

(21) Appl. No.: 09/513,152

(22) Filed: Feb. 25, 2000

Related U.S. Application Data

(60) Provisional application No. 60/122,022, filed on Feb. 26, 1999.

(51) Int. Cl.$^7$ .............................. G06G 7/00; G06F 15/18
(52) U.S. Cl. ...................... 706/3; 706/4; 706/8; 706/9
(58) Field of Search .................... 706/3, 4, 8, 9

(56) References Cited

U.S. PATENT DOCUMENTS

| | | | | |
|---|---|---|---|---|
| 5,341,439 A | * | 8/1994 | Hsu | 382/28 |
| 5,436,979 A | * | 7/1995 | Gray et al. | 382/141 |
| 5,648,782 A | * | 7/1997 | Albo et al. | 342/26 |
| 6,072,889 A | * | 6/2000 | Deaett et al. | 382/103 |

FOREIGN PATENT DOCUMENTS

| | | | |
|---|---|---|---|
| JP | 5-290169 | * | 11/1993 |
| JP | 5-290170 | * | 11/1993 |

* cited by examiner

*Primary Examiner*—George B. Davis
(74) *Attorney, Agent, or Firm*—Mirick, O'Connell, DeMaille & Lougee, LLP

(57) ABSTRACT

The invention uses fuzzy logic and/or probability distributions to automatically calculate and display the effects of contextual information on the confidence that an object in an image is an object of interest. The goal is to assist in determining the location and type of target objects of interest in that imagery. The imagery can come from any kind of imaging sensor or can be non-sensor imagery (e.g., two-and three-dimensional maps), and can be live or archived imagery. The locations of context objects can be provided by a human or a computer. The resulting set of data, including the original imagery, the locations of context objects, any results from AOD, and predictions about target object type and location, can be combined into a display that helps a human better understand where target object appears in the imagery.

37 Claims, 39 Drawing Sheets

(21 of 39 Drawing Sheet(s) Filed in Color)

PRE- AND POST-PROCESSING

INPUT MEANS 2

(A)   (B)   (C)   (D)

(E)   (F)   (G)

(A)          (B)          (C)

(A)   (B)   (C)   (D)

METHOD TO AID OBJECT DETECTION IN IMAGES BY INCORPORATING CONTEXTUAL INFORMATION

CROSS REFERENCE TO RELATED APPLICATION

This application claims benefit of copending Provisional patent application serial No. 60/122,022, filed on Feb. 26, 1999.

GOVERNMENT RIGHTS CLAUSE

"This invention was made with Government support under Contract Number F41624-95-C-6017 awarded by the Department of the Air Force. The Government has certain rights in the invention."

BACKGROUND OF THE INVENTION

Automated object detector (AOD) systems use computer-based algorithms to detect objects of interest in an image. AODs typically measure how well each piece of an image represents a known object, then highlight those pieces where the measure exceeds some threshold. In theory, an AOD can scan a complex image to identify objects better and faster than a human can. In practice however, the simple comparisons performed by AODs are not very robust, and to avoid missing valid objects, they often detect questionable objects, resulting in false detections. A better approach, as described below, would be to encode, either manually via direct human input or automatically by a computer system, available contextual information concerning an image in order to filter out false alarms while increasing the probability that the AOD correctly detects valid objects. There is also the need to combine contextual information with an image to aid the human in detecting objects of interest when no AOD is available.

BRIEF SUMMARY OF THE INVENTION

The present invention uses fuzzy logic and/or probability distributions to automatically calculate and display the effects of contextual information (location and characteristics of "context objects") on confidence that an object in an image is an object of interest ("target object"). The goal is to assist in determining the location and type of target objects of interest in that imagery—both for AOD operation and for human-only (no AOD) operation. The invention's uses include post-processing imagery to enhance the validity of the results of an AOD system or human detection, and pre-processing imagery to enhance the effectiveness of an AOD system or human detection. The imagery used by the invention can come from any kind of imaging sensor (local or remote to the AOD system or human), or can be non-sensor imagery (e.g., two-and three-dimensional maps), and can be live (real-time) or archived imagery. The locations of context objects can be provided by a human or a computer. The resulting set of data, including the original imagery, the locations of context objects, any results from an AOD, and predictions about target object type and location, can be combined by the current invention into a display that helps a human better understand where target object appear in the imagery. This invention can help resolve conflicting versus corroborating contextual information and evidence, positive versus negative types of evidence, vagueness and uncertainty, spatially and/or temporally changing information, multiple types of evidence—including information separated in space and time, and attention competing (distracting) evidence. The context objects can be either visible to a human or not visible to a human. They can be used to provide a reference point to highlight regions of interest in the image, a placeholder to return to after searching an image, and/or a reference of known size as a yardstick to determine size and distances of context objects and targets in an image.

Has many APPLICATIONS. Other modifications are also possible. For example, as discussed previously, the invention advantageously may be employed in other applications such as, for example, medical imaging. The invention also advantageously may be used for remote sensing and prospecting, geological fault detection, weather forecasting, etc., aiding decision making in dynamic social and economic systems, and in general any application where a human must make decisions in a time-critical fashion.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 12a–12g are similar to FIGS. 21a–21f, in which FIG. 12a is a sample AOD output without human intervention, 12b includes added evidence (the treeline), and confidence level output, 12c includes the autonomous selection/deselection of objects, 12d shows an example of fuzzy confidence contours, 12e adds treeline and road evidence to that, 12f shows the result when the uncertainty level is doubled, and 12g shows the results with the uncertainty level halved.

FIG. 18b shows the same output, but with crisp-valued rather than fuzzy-valued contours.

FIG. 20b shows examples of different types of evidence corresponding to the shapes in FIG. 20a.

DETAILED DESCRIPTION OF THE INVENTION

I. Definitions

Figure 1:
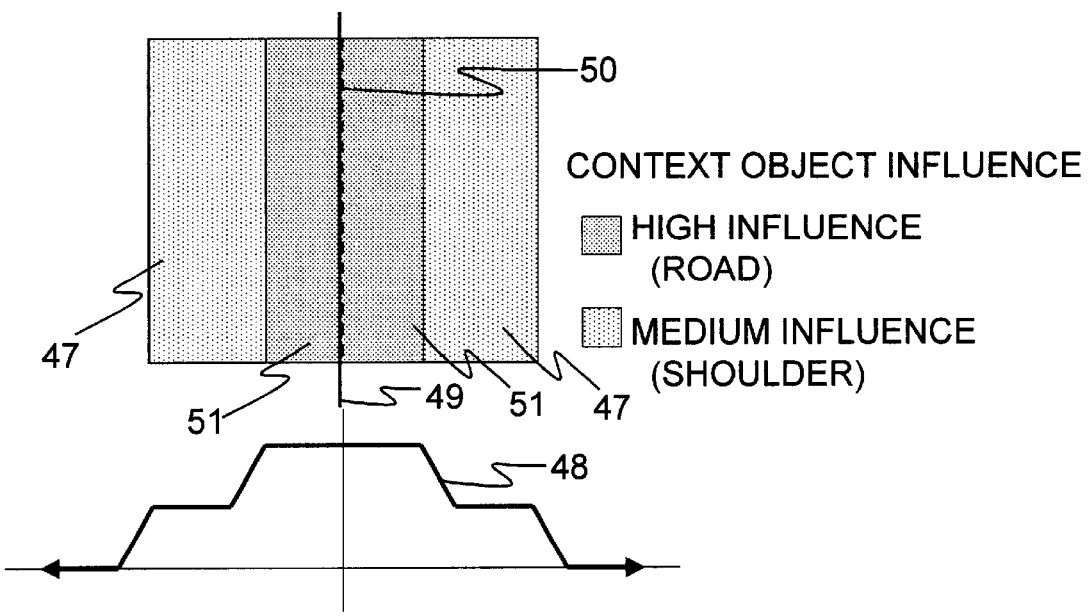
FIG. 1: Depiction of a sphere of influence

Imagery—Multi-dimensional data intended for visual interpretation by a human or automatic processing by an AOD, Examples include sensor data such as camera images, infrared imagery, synthetic aperture radar (SAR) and laser radar range images, and artificial data such as maps and renderings of CAD or other virtual models.

Automatic Object Detection (AOD) system—A system that receives imagery, and attempts to automatically detect objects of at least one type in that imagery, using predetermined criteria, such as the nominal appearance of the objects.

Target Object—An object in am image of interest to a human or an AOD.

Context Object—An object indicative of contextual information or evidence associated with an image, and/or a target object in that image. Context objects can be represented as points, lines, polygons, closed curves, or solids, often with fuzzy edges to show that the object boundaries are imprecisely known.

Target Confidence—The level of confidence that a target object has been correctly detected by an AOD at a particular location in an image, based on that location's distance in the image from the context objects.

II. Predicting target confidence

The present invention is a method to enhance a human's ability to locate target objects in imagery. The invention uses the locations of context objects in the imagery to predict where target objects will or will not appear, then augments the imagery to show these predictions. Each context object has a "sphere of influence," meaning an area over which it impacts the likelihood of a target object appearing. This section examines, in the context of the present invention, how this sphere of influence works, how to define one, and how to combine the impact of multiple spheres.

A. A Context Object's Sphere of Influence

A context object's sphere of influence is defined by a function describing impact on target confidence as a function of distance from the object. In the example depicted in FIG. 1, a two lane road 51 may strongly predict the presence of cars within one lane-width of its center-line 50, weakly predict cars within two lane-widths (cars parked on shoulder 47), and have insignificant impact beyond that distance. A two-lane road 51 might be a *context object* for detecting cars. The context object could be represented as a center-line (shown as a solid line 49) and a sphere of influence cross section 48. The overlaid centerline of the context object 49 may not be registered properly with the true centerline (dotted line 50). The cross section 48 sphere of influence has high value on the road 51, medium value on the shoulder 47, and no value beyond. It has gradual transitions in value, to reduce the error in center-line placement.

Other examples show other possible features of context objects. A context object such as a lake would strongly reduce confidence in cars appearing within the lake. A context object such as an image patch moving steadily with respect to the background could strongly increase confidence that patch represents a vehicle. A dust cloud might increase the confidence in vehicles found at the edge of the cloud but have little impact inside or outside the cloud. If target objects appear in groups, then previously identified objects can act as context objects. Similarly, reports of an object being at a certain location might increase the probability of it appearing near that location. If a context object moves unpredictably or evolves, and is not continuously monitored, its sphere of influence might even change with time, increasing in extent but decreasing in strength, to account for increasing uncertainty.

In general, and as shown in FIG. 1, the level of impact should change gradually, even if appropriate values are well known. In the figure, these gradual changes mean that a small shift in center-line location will only slightly change the impact at any given distance. This makes the road's confidence predictions robust to small errors in placement of context objects. Such errors are very likely, as both the sensors that generate imagery and the input device used to mark context objects are subject to poor resolution, unsteady/hurried human users, sensor drift, systematic errors, and inaccurate sensor pointing and position measurements. Fuzzy boundaries accurately show the resulting confidence in an object's general location as a target object, but not in its exact boundaries. As the confidence in boundaries increases, the fuzzy boundaries simply transition more abruptly, becoming crisp boundaries if an object's location is known perfectly.

In the preferred embodiment of the present invention, a human decides what types of context objects are relevant to a particular mission. This is because the human can draw on experience, common sense, and intuition, to identify useful context objects. Programming the relationship between all possible context and target objects would be a huge endeavor, with uncertain benefit. Once the human defines important objects, the human and computer collaborate to define each context object's influence function. The human defines the basic shape and time dependency of the function, again from intuition.

The human or the computer add in fuzziness to account for known errors and drift rates in the hardware used to detect and mark the context objects' locations. The computer then refines the sphere of influence functions to optimize performance.

B. Optimizing a Sphere of Influence

Unlike the general shape of influence functions, their precise values are not intuitive. The only obvious guide is that membership functions are correct if the system performs optimally. To generate such an optimal system, one must iteratively pick membership functions, evaluate system performance, and modify functions to improve performance. One way to automate this task is to use genetic algorithms. Genetic algorithms are well suited to finding optimal inputs to a system where output is measurable, but the relationship between input and output is not.

Genetic algorithms work as follows. A complete set of parameters for a system (e.g. the influence functions for a set of context objects) is concatenated to form an individual. The individual's fitness is a measure of how well the system performs, given these parameters. High fitness indicates good system performance (e.g. accurate assessment of target confidence). The genetic algorithm begins by generating a population of individuals, then evolves the population in steps. In each step, it selects pairs of parent individuals from the old population, and uses them to create individuals in a new population. Parents are selected based on fitness, affording more fit individuals a better chance to reproduce. The new individual consists of pieces of the two parents, copied and spliced, possessing aspects of both parents. That individual is then mutated, changing a few values slightly to introduce new features not present in either parent. Over generations, very fit individuals (whose parameters optimize system performance) come to dominate the population. When the population's fitness stops changing across generations, it has reached an optimum state, and the algorithm stops. Because genetic crossover and mutation can create individuals across the complete range of parameters, it is likely that that optimum state is a global optimum, not simply a polishing of the original individual.

The preferred embodiment of the present invention uses a modified genetic algorithm, which begins with a population based on the human defined sphere of influence functions. The algorithm chooses only one parent, and copies it directly into the new population. It then applies mutations, including shifting, stretching, compacting, and changing the shape of individual influence functions. Fitness of each new individual is evaluated by running the present invention in simulation, using the influence functions represented by the individual, and evaluating how accurately they predict the locations of target objects. Note that although the preferred embodiment uses this algorithm, the invention is intended to encompass any other optimization algorithms, including but not limited to other genetic algorithms, back-propagation learning, vector classification, gradient descent, pole placement, and population based incremental learning, alone or in combination.

C. Combining Spheres of Influence

To calculate target confidence at a given location, the present invention measures the distance from that location to each context object, finds the value of each object's influence at that distance, and combines the values for each context object. In its simplest embodiment, combining could just mean summing the various values, some of which might be negative. The present invention could add the resulting number to some initial confidence, for instance 50%, clamping the result to within 0% to 100%. There are several simple upgrades to this procedure. For instance, the initial confidence value could be provided by an automatic object detection system (AOD), or it could take one of two values (e.g. 25% and 75%) depending on whether an AOD identifies a target at that location. Also, the invention could increase accuracy by using combinatorial analysis to combine influences.

A more complex option is to combine values using fuzzy logic. Fuzzy logic converts inputs to outputs in three steps. First, it determines how well an input belongs to (i.e. its membership in) various fuzzy sets. Second, it determines each set's support for each possible output value. Third, it selects the output value with the most support. In the present invention, each context object would be a fuzzy set, and the fuzzy output variable could have only one value, namely target. In the first step, a context object's influence function, indexed by the distance from the context object to a particular location, would determine the locations membership in the context object's set. In the second step, each set would provide positive or negative support, in proportion to the location's membership. With the proportionality constant absorbed into the influence function, each context object's support would equal the location's membership. In the third step, support from the various sets would be combined, as mentioned above, to generate target confidence.

The value of fuzzy logic becomes more apparent in complex embodiments of the present invention, where there are multiple types of target objects. In this case, the invention must calculate target confidence for each type of target. In fuzzy logic, this means an output variable has one value per target type. Each object would still use its influence function as a fuzzy membership function. In addition, each object would include an output function, showing proportionality constants for each target type. As an example, the fuzzy output variable might take on five values: boat, car, tank, cannon, and personnel carrier. A context object, such as a lake, would have its original function, describing the boundary of the lake, and a new function that might show a large positive value for boats (likely to appear in lakes) and large negative values for the other vehicles (not likely to appear in lakes). Rather than five functions to relate location to target probability for each target type, fuzzy logic needs only two.

While the above discussion mentions two specific examples, the present invention is intended to include variants of these means, such as intelligent agents, neural networks, and voting. It also includes more complicated methods, such as those that handle nonlinear interactions between spheres of influence, such as the negative influence of a minefield canceling, rather than simply reducing, the positive influence of a road.

III. Enhancing an Automatic Object Detection System

One of the best uses of the present invention is to improve the results of AODs by processing their input and/or output imagery. In these scenarios, a user identifies context objects in imagery, and the computer combines spheres of influence to predict target confidence. The invention can then enhance the input to the AOD, to modify the chance of detecting targets in various image regions to correspond to the target confidence of those regions. This increases the probability of finding correct targets, allowing the AOD to be more discriminating in what it calls a target, reducing the number of false alarms. The invention can determine the target confidence at locations that the AOD declares contains targets, and to show the user which targets have high confidence, and which do not.

Although the following description refers to preferred embodiments and methods of use, the present invention is not intended to be limited to these preferred embodiments and methods of use. Rather, the present invention is of broad scope and is intended to be limited only as set forth in the accompanying claims.

A. AOD Post-processing

One application of the present invention is to post-process AOD results. In this application, the AOD identifies targets, probably including false alarms. The present invention then calculates target confidence for each target. The user can quickly see which targets are high confidence, and can react to those targets first, moving on to lower confidence targets as time allows.

Figure 2:
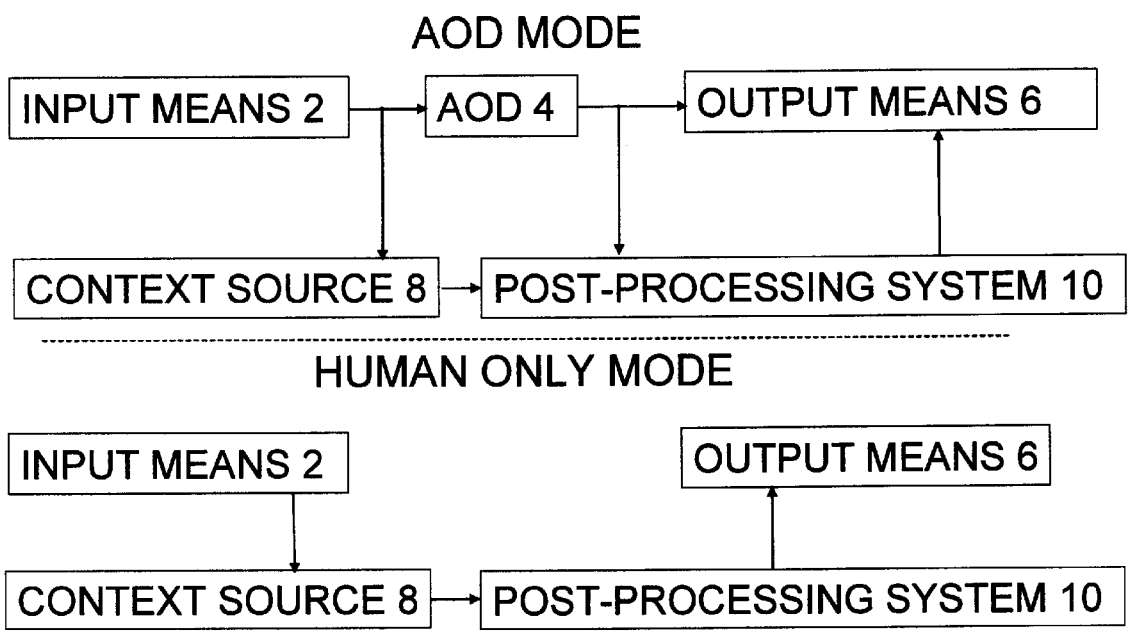
FIG. 2: Block diagram of the present invention, applied as an AOD post-processor

FIG. 2 diagrams this application. AOD 4 reads imagery from input means 2, uses pre-defined criteria (e.g., shape, position, speed, contrast, intensity pattern) to determine the target confidence at each image point, and identifies the points for which this confidence is high. AOD 4 may use any conventional technique for a given image processing, or object recognition, detection, or queuing application. The AOD algorithm may be proprietary, and may be built into a black box. The AOD operates solely under preprogrammed computer control, with no human intervention. The results of AOD 4 flow to output means 6. Output means 6 may generate any output that identifies the targets, such as new image with targets highlighted, or a list of target locations. It may identify target confidence, or simply whether the object is a target. It may display the results to a screen, store them, print them, or transmit them to another system.

Referring again to FIG. 2, the present invention becomes a post-processing system 10. A context source 8 determines the positions of context objects in imagery from input means 2. Post-processing system 10 combines these context object locations, as described before, to determine target confidence at target locations identified by AOD 4. It may also eliminate false alarms, meaning targets with low target confidence. Output means 6 can combine the results of post-processing system 10, namely an improved understanding of which image locations represent targets, with the results of AOD 4.

B. AOD Pre Processing

A second application of the present invention is to pre-process AOD input imagery. Pre-processing system 12 determines the target confidence in each region of an, obtained from image from input means 2, using the locations of context objects provided by context source 8. This is the same system as in the previous application, except that target confidence is now determined across the image, not just at specific points, and it is performed before AOD 4 operates. AOD 4 applies conventional pattern recognition or object recognition algorithms to identify and highlight targets in an image, and sends the new image to an output means 6. Unlike in the post-processing example, AOD 4 can use the target confidence map, created by pre-processing system 12, to vary the threshold it uses for detecting targets, allowing it to find more targets in high confidence regions, fewer in low confidence regions.

C. AOD Pre- and Post-processing

Figure 4:
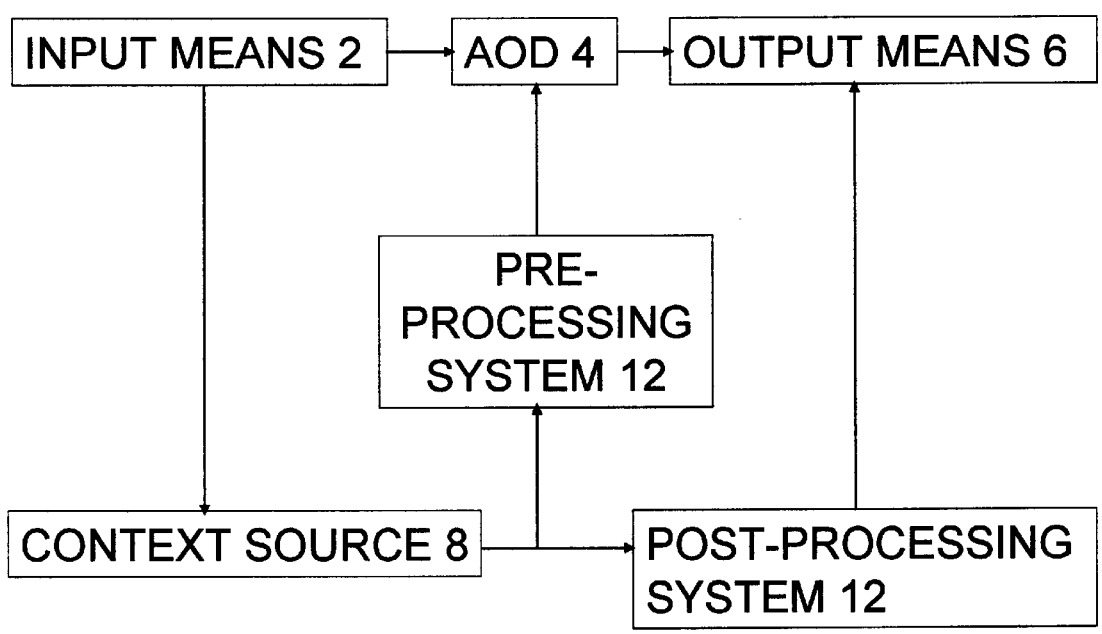
FIG. 4: Block diagram of the present invention, applied as an AOD pre-processor and an AOD post-processor

A third application of the present invention, depicted in FIG. 4, is the combination of the previous two. It uses the context object locations from context source 8 both before and after the application of AOD 4. Pre-processing system 12 first uses context object locations to evaluate target confidence across images from input source 2. Next, AOD 4 uses the resulting confidence map to modify its probability of detecting targets, increasing probability of detecting actual targets, while decreasing probability of detecting false alarms. Finally, post-processing system 10 uses the context again to find target confidence for the targets identified by AOD 4, and may eliminate targets that are likely false alarms. This application correctly identifies more objects, with fewer false alarms, than would AOD 4 alone.

IV. Imagery Sources

Figure 3:
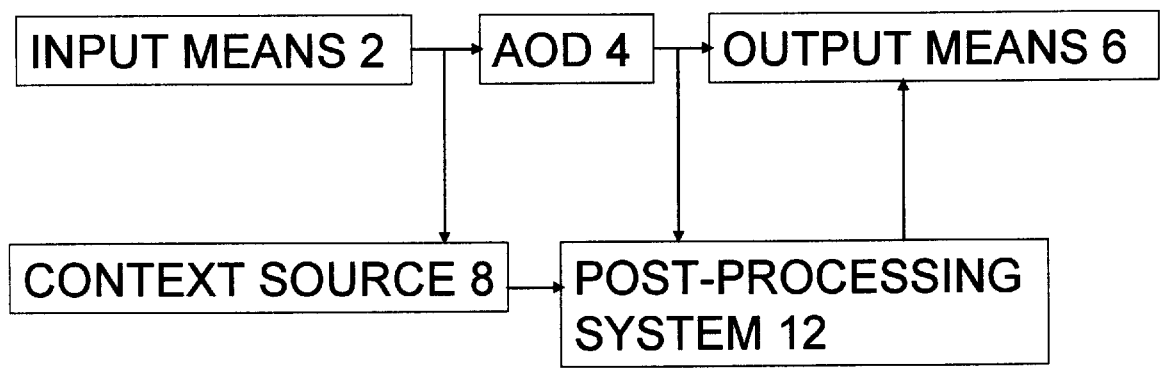
FIG. 3: Block diagram of the present invention, applied as an AOD pre-processor
Figure 5:
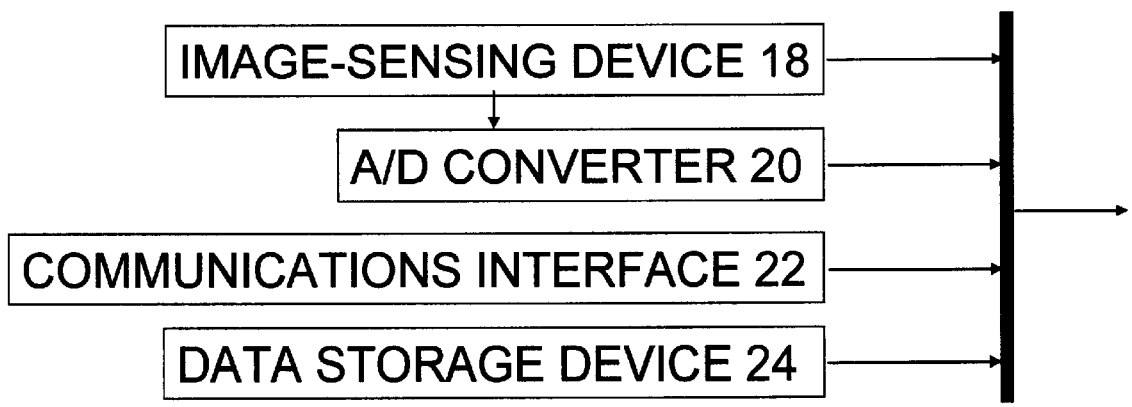
FIG. 5: Block diagram of implementation options for imagery input means

The imagery used in the present invention can come from a variety of sources, referred to as input means 2 in FIGS. 2, 3, and 4. FIG. 5 gives a more detailed view of image means 2, showing several implementation options. The first two options include an image sensing device 18, which can be any conventional, single-frame or real-time input device, such as a scanner, a passive electromagnetic imager (e.g. FLIR, video camera), or an active electromagnetic imager (e.g. radar, SAR, CT scan, x-ray, MRI, laser range finder.) In the first option, image-sensing device 18 provides a digital image as its output. In the second option, image-sensing device 18 produces an analog output, which A/D converter 20 digitizes. A/D converter 20 can be any A/D converter known in the art that can digitize images at an appropriate bit depth resolution and/or speed for real-time or near-real-time operation. The third option is a communications interface 22 that converts remote input to digitized output. The fourth option is a data storage device 24 (e.g., hard disk, floppy disk), which stores images for later input. This is particularly useful for strategic images, such as maps, satellite imagery, or anatomical atlases. In addition to the enumerated options, the present invention is intended to include all equivalents, and any combinations, such as a remote image-sensing device 18 communicating via a communications interface 22.

V. Entering Context Objects

The discussion so far assumes known locations of context objects. The source of this information has been referred to as context source 8 in the FIGS. 2, 3 and 4. The context source 8 identifies context objects and their context information (i.e. type, location, sphere of influence, and time dependencies), by entering this information into a database. The context source can then modify an object's information, or delete the object. For instance, it might decrease the magnitude of influence and/or increase the extent of influence when the identity or location of an object is imprecise, uncertain, unreliable, or based on old information. It might then modify the object's location when more certain information becomes available. The context source records object locations in 3D coordinates where possible, so that spheres of influence can be projected into any image for which the viewpoint is known. When projecting a sphere of influence onto a surface involves taking the intersection of the sphere with the surface, the present invention assumes the availability of a range image, terrain map, multiple sensors for triangulation, or some other way to determine the intersection.

An important feature of context information is that it can be encoded to include time dependencies. For instance, a context object's location may be set to change over time, if an object is moving predictably, or its sphere of influence may be set to expand in size but decrease in magnitude, to represent a mobile but unpredictable object. Spheres of influence might be set to evolve to compensate for object's whose shape evolves, or sensors with known drift rates. The present invention automatically modifies the objects in real-time, to implement the time dependencies encoded in the context information.

Figure 6:
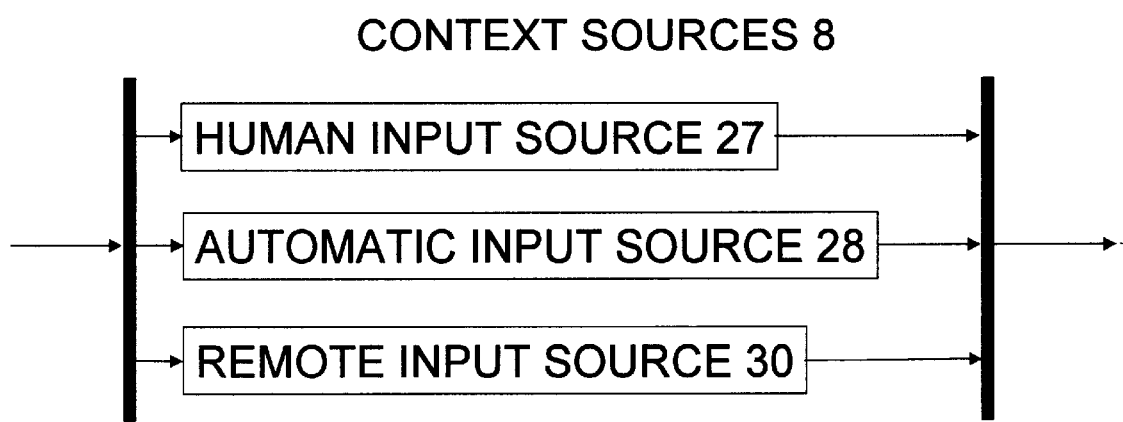
FIG. 6: Block diagram of implementation options for context source

FIG. 6 shows that context source 8 is actually any of three types of sources, or a combination of multiple types. The three types are the human input source 26, the remote input source 28, and the automatic input source 30.

A. Human Input Source

Figure 7:
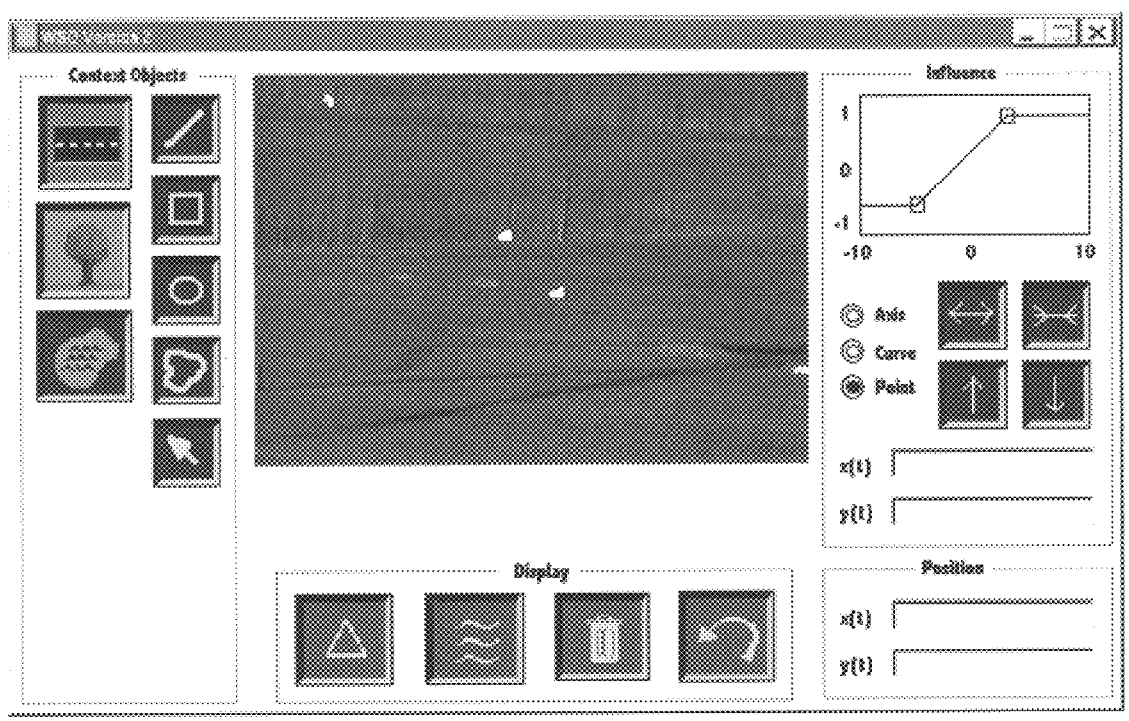
FIGS. 7a and 7b: Menu system for context input tool FIG. 8. Block diagram of display FIG. 9. Example display

The most direct, and preferred, option is the human input source 26. The human might perform most identification off-line, using reconnaissance imagery, then add objects in real time as they appear during a mission. In both cases, the human looks at one or more images, from one or more sensors, shown on one or more displays, recognizes context objects in the images, and uses some input device to mark those objects' locations on the display(s). If possible, the invention generates the 3D coordinates of the object, based on its location in multiple images. The input device can be any input mechanism known in the art (e.g. mouse, touch-screen display, or voice recognition). However, the preferred tool is the menu-driven touch screen, which combines display and input in one. An example menu system is shown in FIG. 7. Buttons allow the user to specify the shape of an object and its sphere of influence. They facilitate modifying the sphere of influence to account for known errors associated with various mission sensors. A place holder allows the user to mark an area of interest, allowing him to quickly return to that spot after looking away. Rulers let the user measure objects in the image. The menu system is tailored for each particular mission (e.g., medical imaging, search and rescue, general-purpose object recognition) by the human who defines the set of mission-relevant context objects.

Human input is the preferred context source because context types are defined by humans aid easily understood by humans, but defining them with sufficient detail to allow a computer to reliably detect them would be labor intensive. Consider for instance the m any possible colors, widths, and edge types for roads, which a human immediately recognizes, but which a human would have to think of ahead of time to program into a computer for automatic recognition. In addition, the human can enter evidence even if it does not appear on the image, for instance because the human can see it, but available sensors cannot detect it.

B. Other Input Sources

The second option is the automatic input source 28. In this option, the invention again uses one or more images from one or more sensors. However, it t he n use s standard image processing tools (e.g., edge detection or correlation) to identify context objects. Looking for evidence is akin to the image exploitation problem the intelligence community faces, and there is commercially available software for this kind of work. Finding such evidence, for simple enough shapes at least, is likely a simpler problem than the tasks an AOD must accomplish, though there is clearly some similarity. The automatic input source automates user tasks, saving him time, and thus is suitable for simple evidence detection when off-line, human detection is impractical.

The third option is the remote input source 30. The remote source can provide context information for context objects, perhaps before the objects are visible to the user. This would be the case when collaborating users operate out of each other's line-of-sight, or use different sensors, so that each sees something the others do not. Sample users might include search parties, with personnel on both ground and air. To implement the remote input source, each copy of the present invention transmits or relays new context information to each other copy. Each copy then receives new information, and adds new objects to its database or modifies old objects to incorporate the new information. This requires a common object addressing scheme, but this is certainly feasible, for instance by having all copies register and relay objects through a central database. Unlike the preceding two options, this option transmits actual object types, locations, and spheres of influence, rather than interpreting this information from imagery.

VI. Displaying Target Confidence

Figure 8:
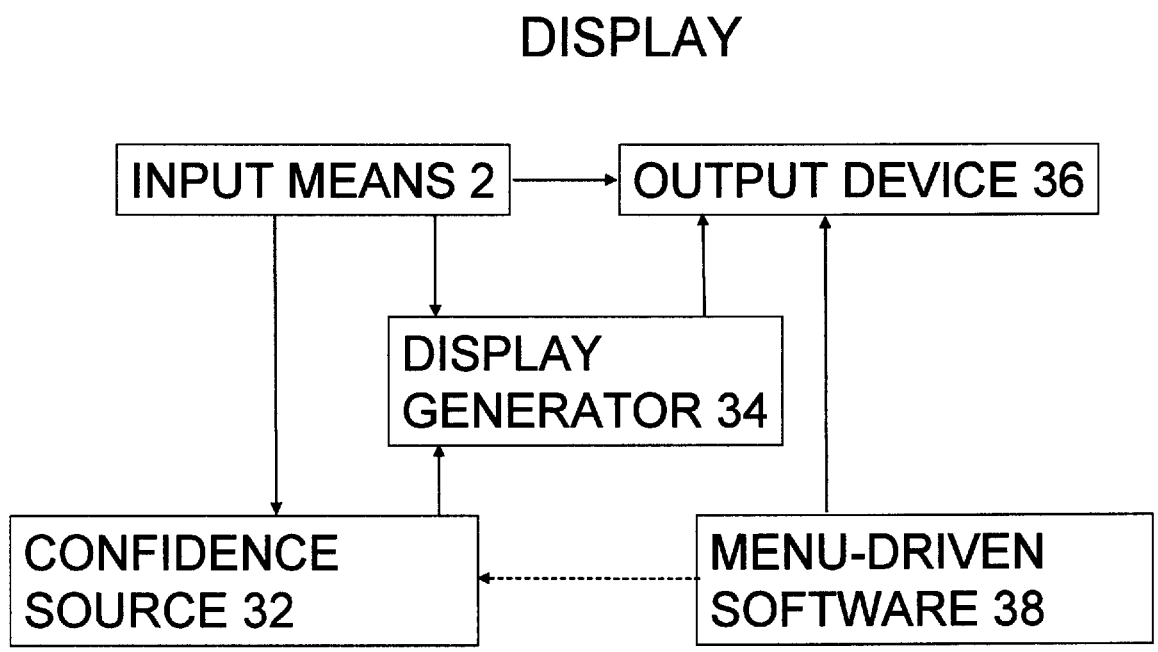

The present invention can generate image overlays, to show target confidence levels at points in imagery. As depicted in FIG. 8, confidence source 32 generates target confidence at one or more locations in the imagery provided by input means 2. Confidence source 32 could use the method heretofore described, or any other method, proprietary or otherwise. If using the methods above, FIG. 8 represents one possible implementation of what FIGSS. 2, 3, and 4 call output means 6. Display generator 34 creates an overlay for each input image, to show confidence source 32's target confidence at one or more locations in the imagery. These displays flow, in parallel with the original imagery, to output device 36. Menu driven software 38 allows a user to customize the format of the overlays, to make them most meaningful for a specific application, and to facilitate image analysis and interaction. Menu driven software 38 can also serve as a human input means to confidence source 32, if needed. Output device 36 can consist of one or more physical displays, corresponding to one or more images provided by input means 2. In this case, display generator 34 creates one overlay for each such image.

Figure 9:
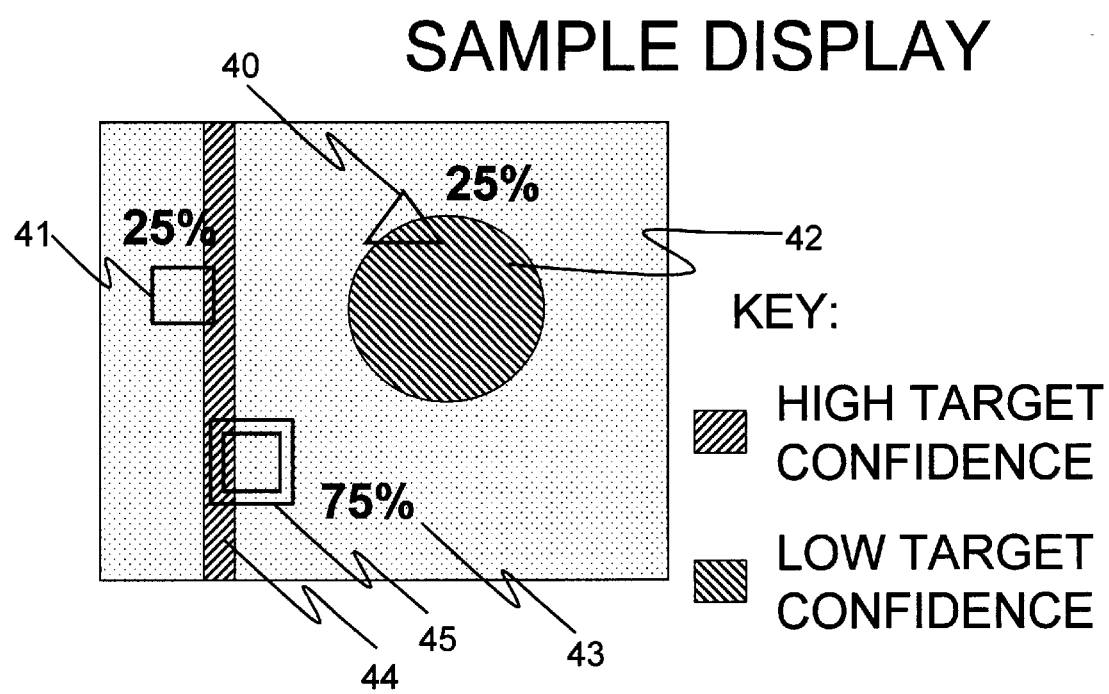
Figure 10:
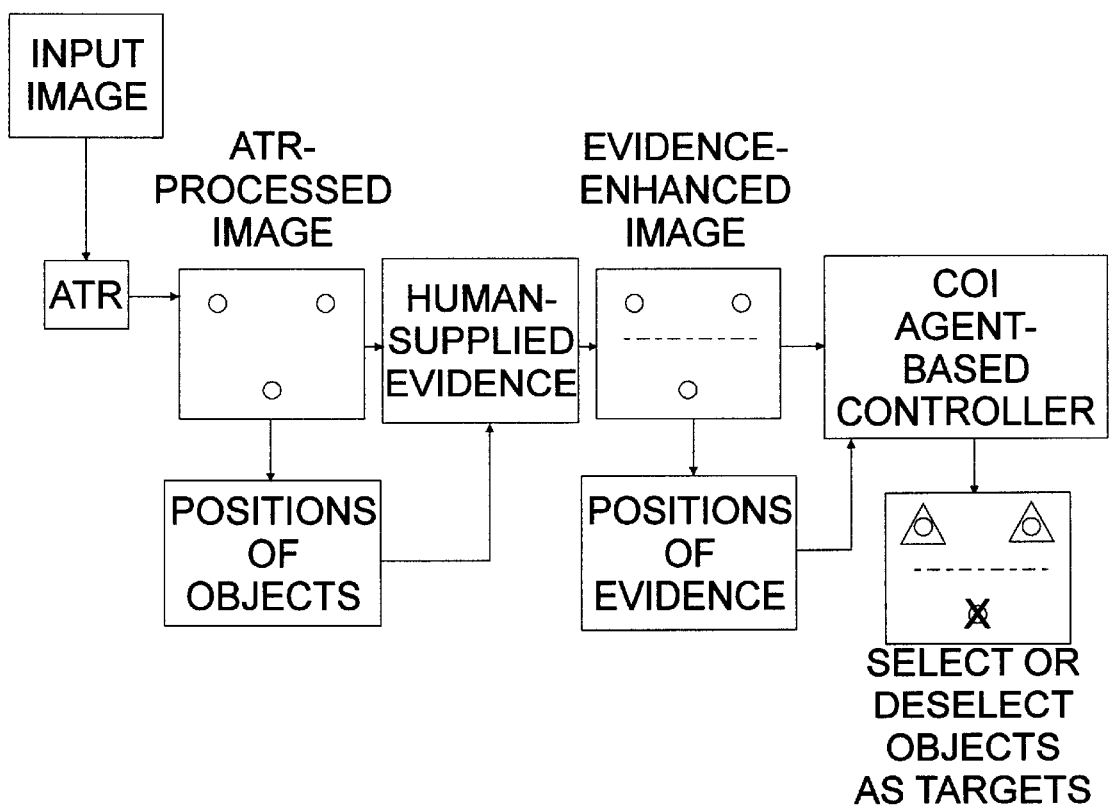
FIG. 10 is a schematic diagram of the general approach of the invention.

FIG. 9 shows an example display, consisting of a greyscale image with colored overlay (shading patterns are used instead of colors for the purposes of this patent). The overlaid target confidence information can be divided into two classes: information about targets, and information about regions.

The first class identifies target confidence at specific image locations that are believed to represent target objects. Such locations could be determined by, for instance, an AOD or a human. The preferred method to identify the location of a proposed target is to overlay a geometric symbol, bracket, or icon, at that location on a display. A different symbol could represent each type of target object, or set of types, allowing the user to more quickly understand the display. The shape could also vary with the level of target confidence (which may be shown using numerical representations 43) in a particular target. For instance, a closed square might represent a high confidence target, while a bracket representing only half of such a square might represent a medium confidence target, and the symbol might be eliminated altogether for low confidence targets. In FIG. 9, symbols 40, 41, 45 identify potential target objects (not shown), one symbol (e.g., triangle, box, double-box) per target-object class. A hight target confidence symbol 45 changes shape from box to double box. A low target confidence symbol 40 changes shape from box to triangle. Alternately or in combination with this, the symbols might be rendered in different colors to show the level of target confidence associated with each. For instance, red, yellow, and green symbols might mark high, medium, and low confidence targets. In addition to symbols, text can be overlaid near target locations, to indicate target identity or confidence. For instance, labels might identify target type or rough levels of confidence, or numbers might identify exact confidence level. Using several features to show confidence levels, at varying level of detail, allows the user to focus on progressively more detailed distinctions between potential targets.

The second class identifies target confidence at image regions, without regard to specific targets. Such information would be useful for instance when a user must manually identify targets. A target confidence map would provide hints as to where to look. The preferred embodiment is to create this overlay from two colors, for instance red (for high target confidence area 44) and blue (for low target confidence area 42) in FIG. 9, one representing increased target confidence (high target confidence area 44), for instance above 50%, and the other representing reduced confidence (low target confidence area 42). The intensity of each color would be proportional to the strength of target confidence. To continue the example, areas of high target confidence would appear bright red, areas of very low confidence would appear bright blue, and areas where no information is available to modify confidence would have no color. The overlay would be semi-transparent, allowing the user to see through the confidence map to the underlying image.

The above explanation discusses the two types of overlay separately, but the present invention is intended to include any combination of the two, as well as each separately. Also, the invention assumes that any implementation might provide a means to toggle the aforementioned symbols, text, and confidence map on or off, to allow a user to see the underlying image.

SAMPLE PROTOTYPE DEMONSTRATION

In the present invention, a mission planner defines relevant targets (e.g., cars), relevant evidence (context object) types (e.g., bridges), associated context rules (e.g., cars are likely to appear near bridges), and a tool with which a user can identify evidence in images.

Figure 11:
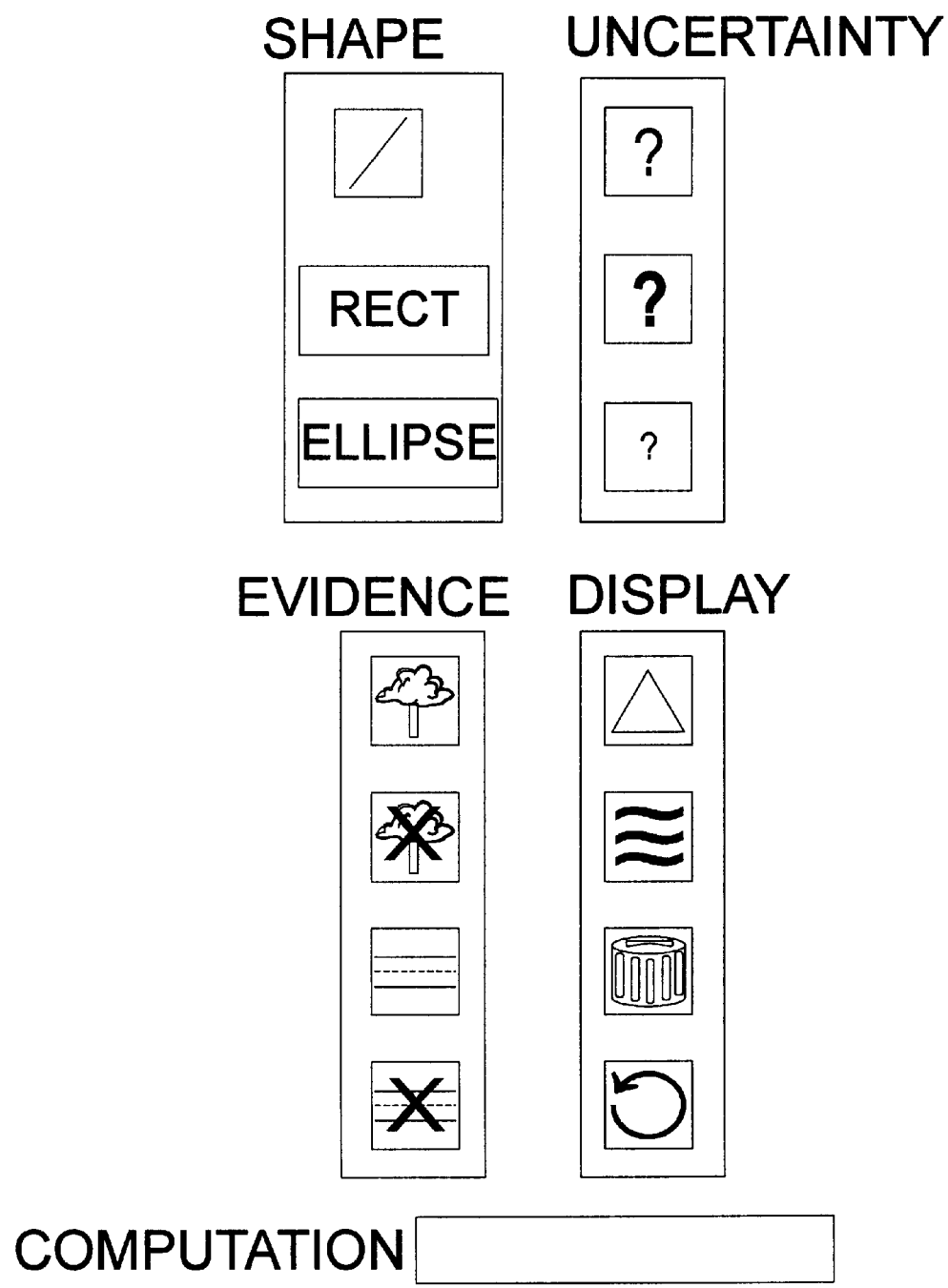
FIG. 11 is a view of a sample user's tool for the invention, which allows the user to select the shape of the evidence, the type of evidence, and the level of uncertainty.
Figure 12A:
FIGS. 12a, 12b, 12c, 12d, 12e, 12f and 12g.

The following is a demonstration of the above concepts. Refer to FIG. 11, Sample Tool, displaying the add-on tool that allows a human to interact with the output of an AOD. The tool allows the user to select the shape of the evidence, the type of evidence, and the level of uncertainty. The various functionalities are described as appropriate. Further details can be found in FIGS. 20*a*–20*d*. In FIG. 12*a* is shown an image representing the output of a hypothetical AOD. The white blobs represent objects believed by the AOD to be the objects being searched for.

Figure 12B:
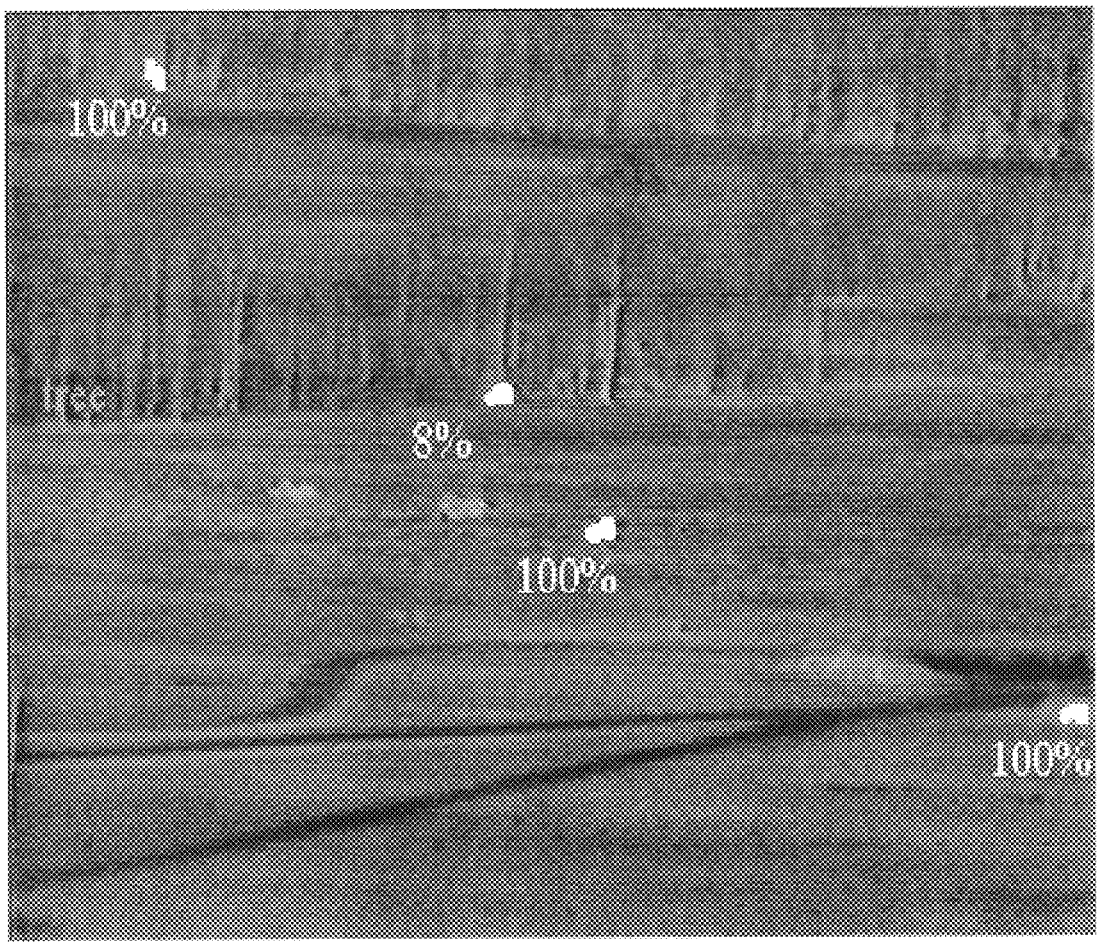

The first stage of the process begins with the user inputting evidence to the computer. He/she can select a geometrical shape (e.g., a line), overlay it on the image, and then select an evidence type (e.g., a treeline). This allows situational awareness to be incorporated into the AOD decision process. The next step is for the system to automatically display confidence values onscreen (along with evidence text), as in FIG. 12*b*. The user can thus evaluate the numerical confidence of objects as potential objects.

Figure 12C:
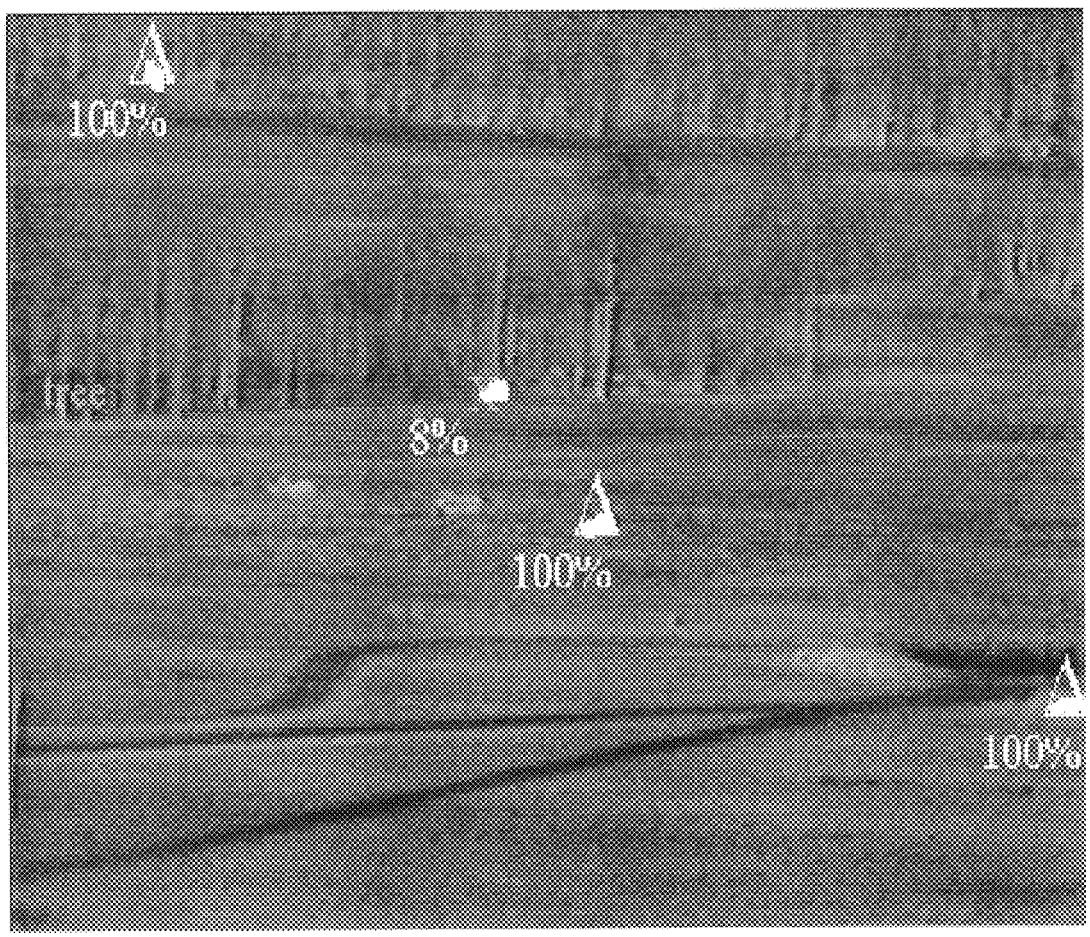

Confidence levels can be displayed graphically as well. FIG. 12*c* shows the autonomous selection/deselection of objects, with triangles over selected objects and crosses (X) on deselected objects. Autonomous output, based on human-supplied input, can free up user time.

Figure 12D:
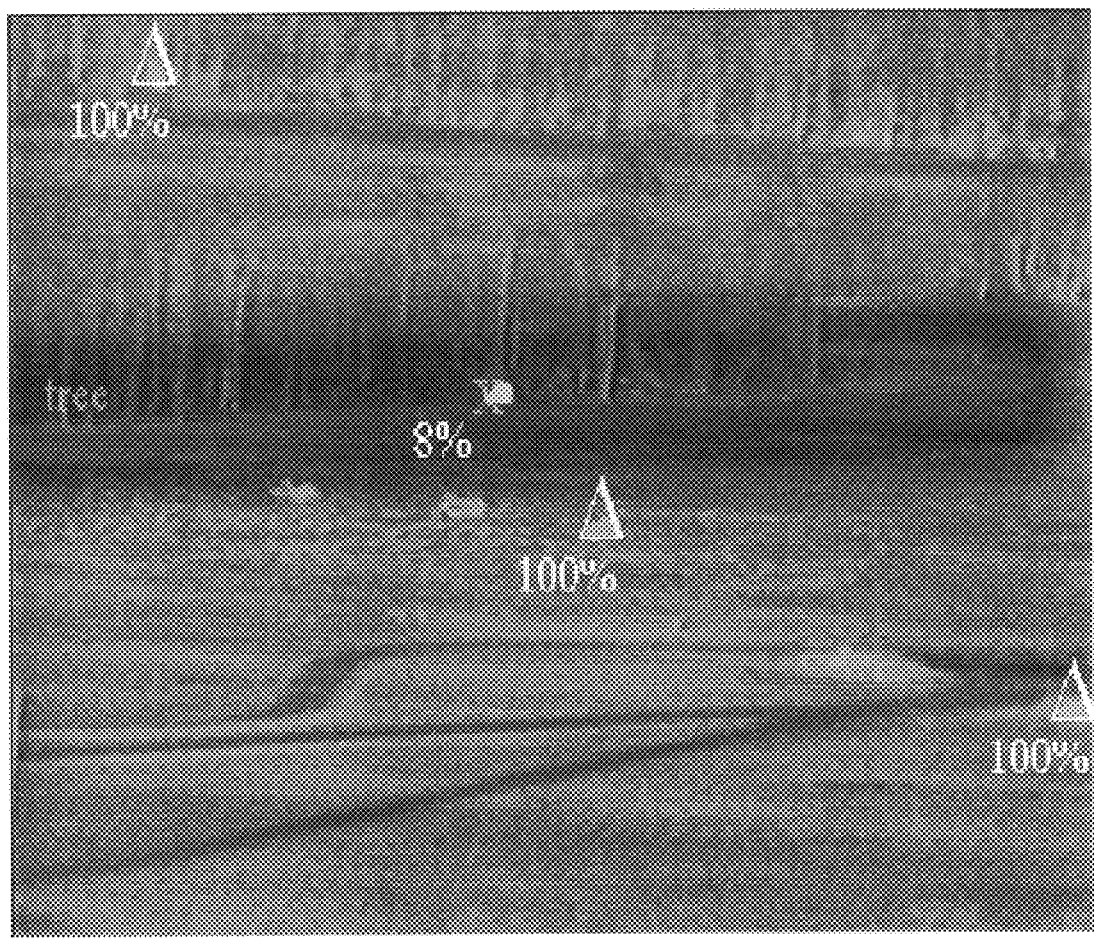

Next is the concept of fuzzy confidence contours. In FIG. 12*d*, ice blue contours can be thought of as representing shapes or regions for which nearness is a bad quality; objects are not near treelines in this example. Red hot contours have just the opposite interpretation; being near (or in this case effectively, within) a shape or region is a good quality. Red regions are where, to varying (fuzzy) degrees, objects are likely to be found. This representation of information allows the user to view the breadth of uncertainty in the most important parts of an image.

Figure 12E:
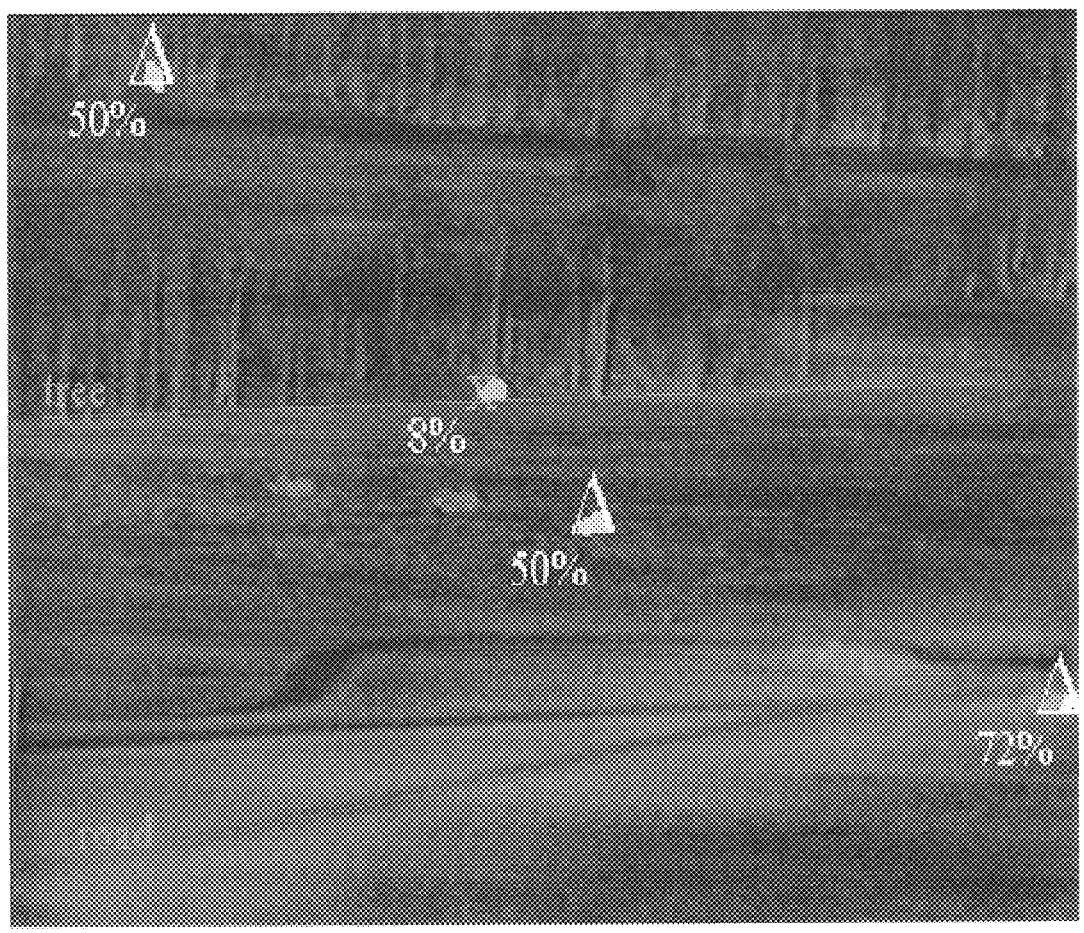
Figure 12F:
Figure 12G:
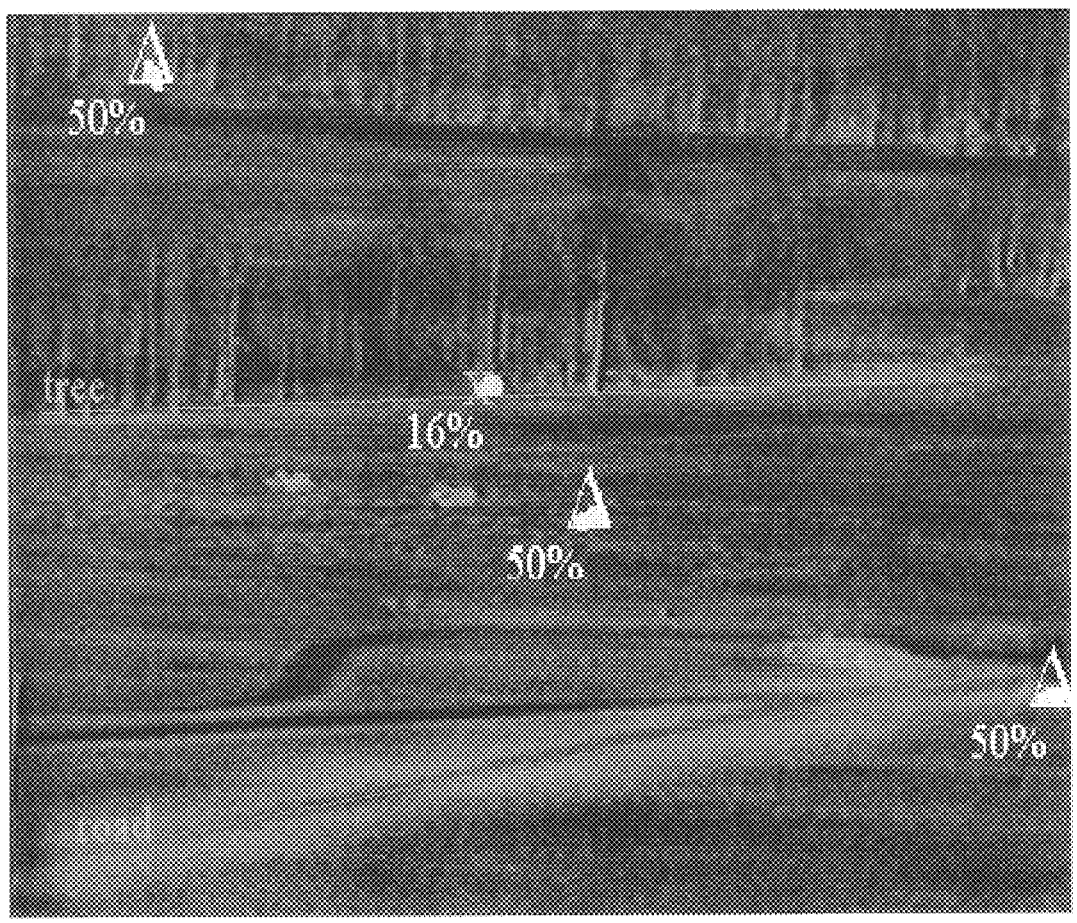

Other pieces of information can be inputted by a human. FIG. 12*e* shows a road added to the image. In this case, objects of interest are near roads (and not near treelines). The confidence levels and fuzzy contours are accordingly updated. The user can thus input increasingly complex situations. Note how previously high confidence (100%) objects are downgraded (to 50%) with the addition of more evidence. As evidence builds, the auto select/deselect can become increasingly important to a user. The fuzzy contours again highlight the regions of interest, according to the mission (as well as regions of disinterest). The level of uncertainty can also be adjusted by the user. Uncertainty bands are here labeled as optimum, broad, or narrow. Here optimum can either be thought of as typical level of uncertainty likely to be encountered, or the result of training and tuning the tool with the evolutionary computation techniques discussed previously. The user can override the optimum setting based on other intelligence. See FIGS. 12*f* and 12*g*, wherein uncertainty has been made broad (twice as wide as typical) and narrow (half as wide as typical), and note how the various decisions and contours are accordingly changed with changing uncertainty levels.

Figure 13:
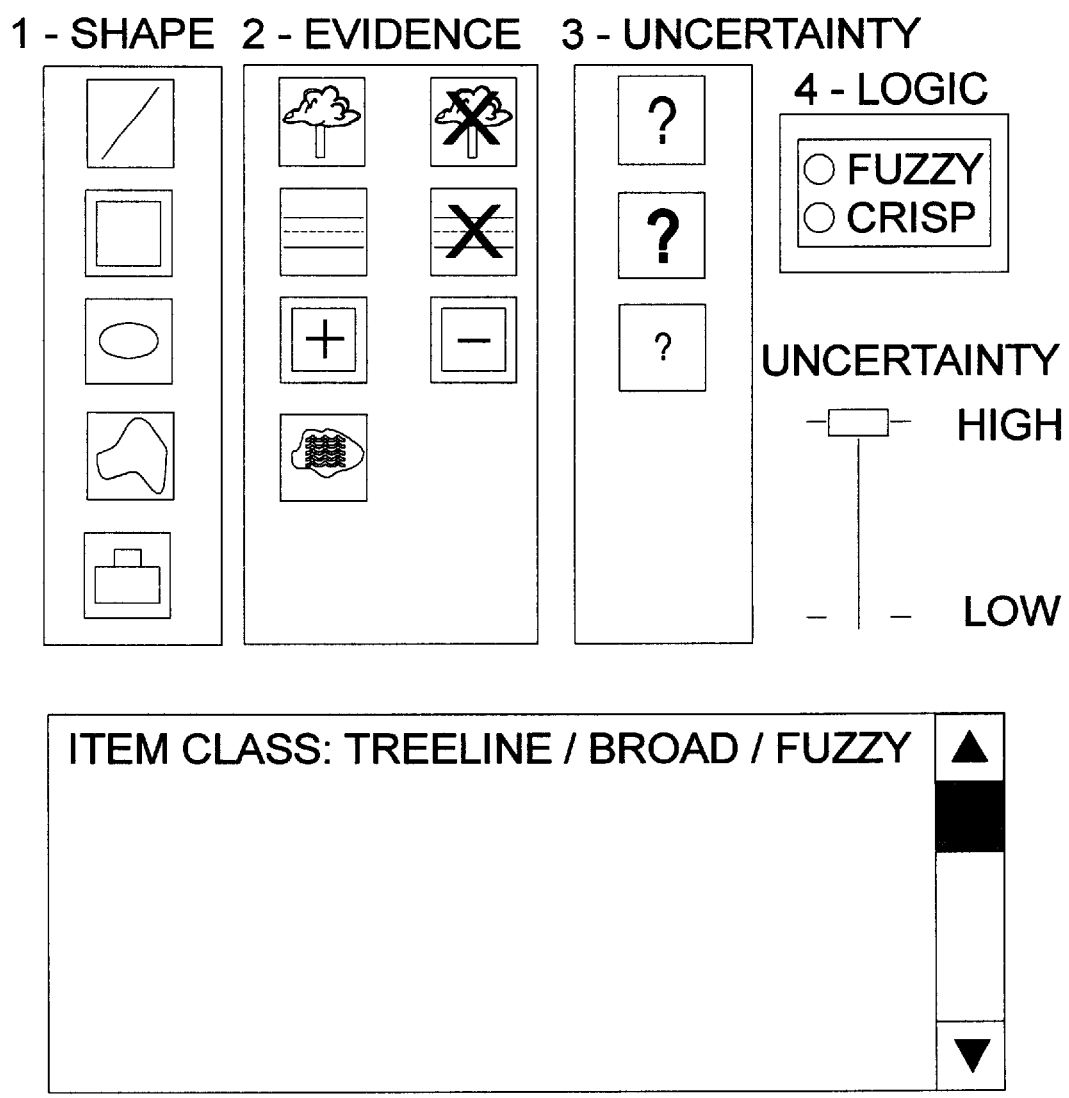
FIG. 13 shows a sample tool for constructing the user's tool of the type shown in FIG. 11.

We make a brief digression and note FIG. 13. The tool shown in FIG. 11 assumed, for illustration purposes, a specific mission (and hence shape and evidence qualities) in mind. In reality, different missions may call for different tools. A mission planner can create a custom tool by choosing the relevant buttons in a tool of which FIG. 13 is an example. The mission planner can add or delete evidence shapes, types, and uncertainties for different user scenarios.

Figure 14:
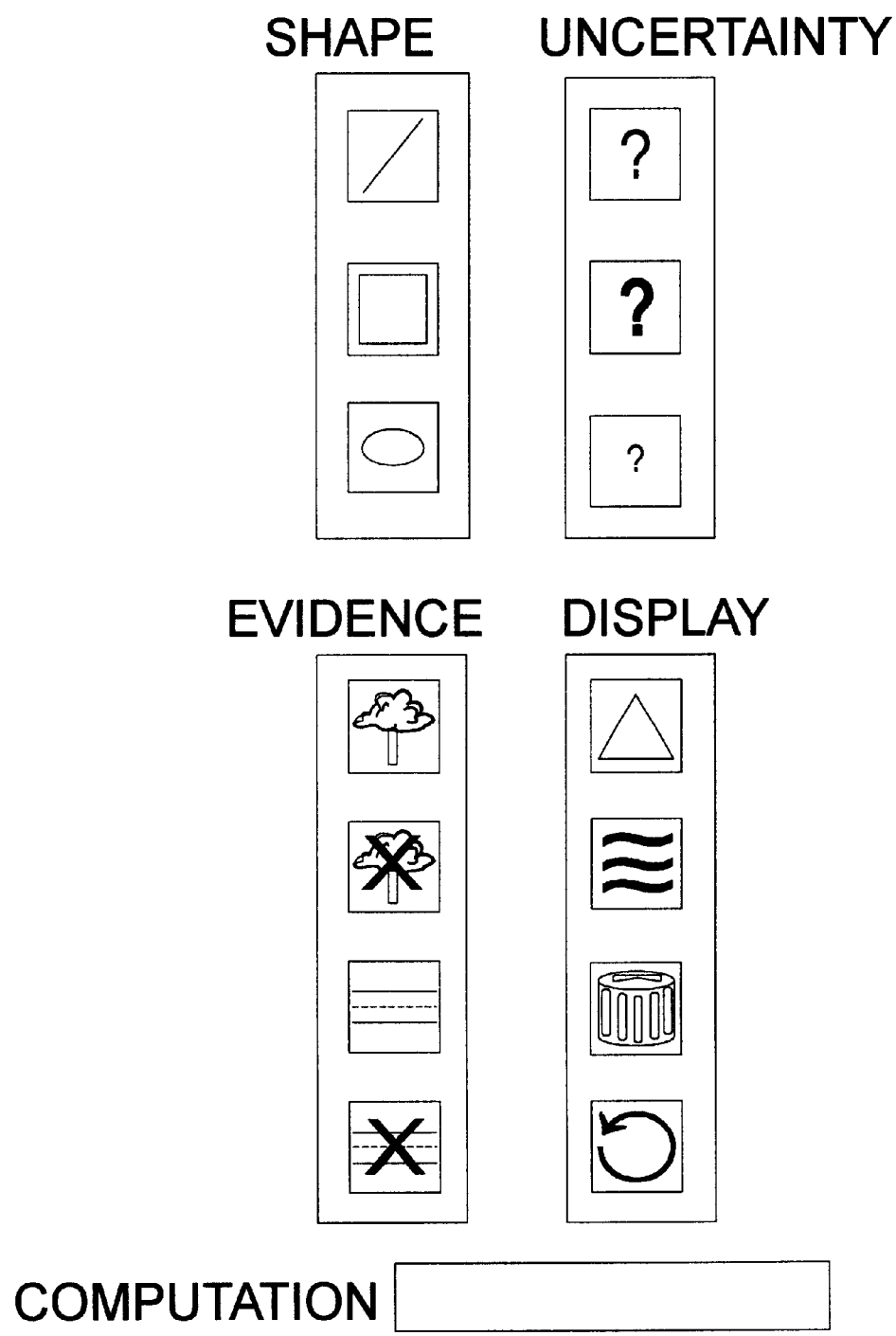
FIG. 14 is another example of a user's tool.
Figure 15:
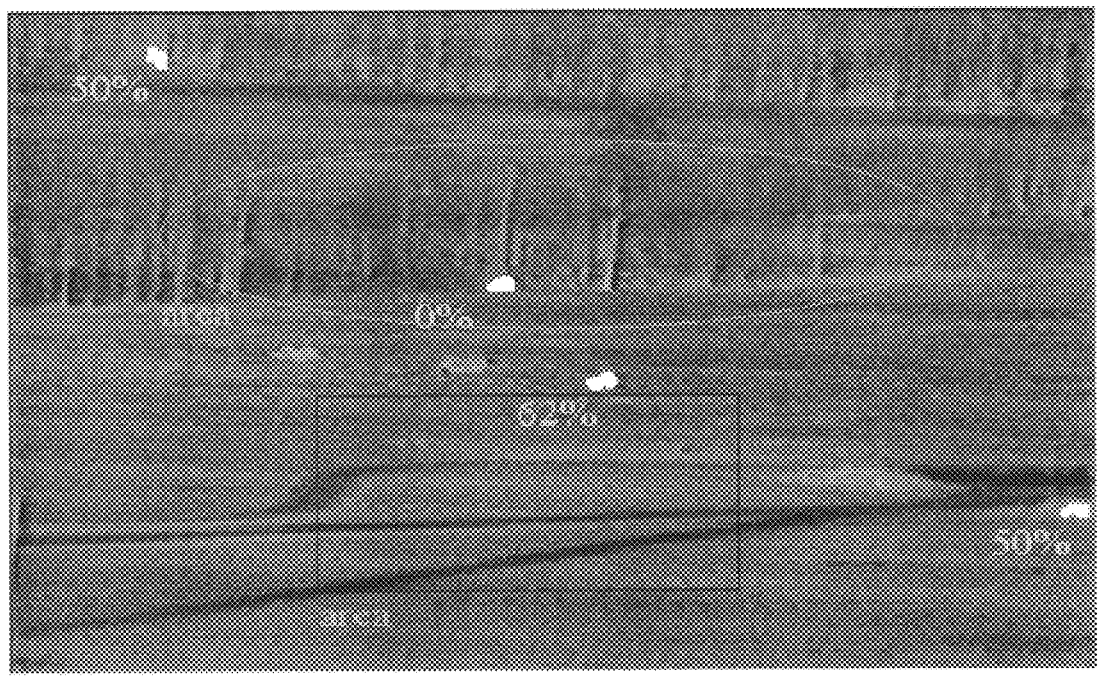
FIG. 15 is a different output scenario to that of FIG. 12b, showing the results of different types of evidence input by the user.

Returning to the main theme, we see how such a construction could build new user tools. In FIG. 14 we have another tool that allows for the addition of new evidence shapes and types. A mission planner can readily configure a different user scenario. The user can use such a new tool to input new evidence, such as areas of inclusion or exclusion (where objects are respectively likely and unlikely to appear), by drawing rectangles and ellipses. See FIG. 15, in which different types of evidence have been input by the user as compared to FIG. 12*b*, and in which objects are not likely to appear in the ellipse, but are likely to appear in the rectangle.

Figure 16A:
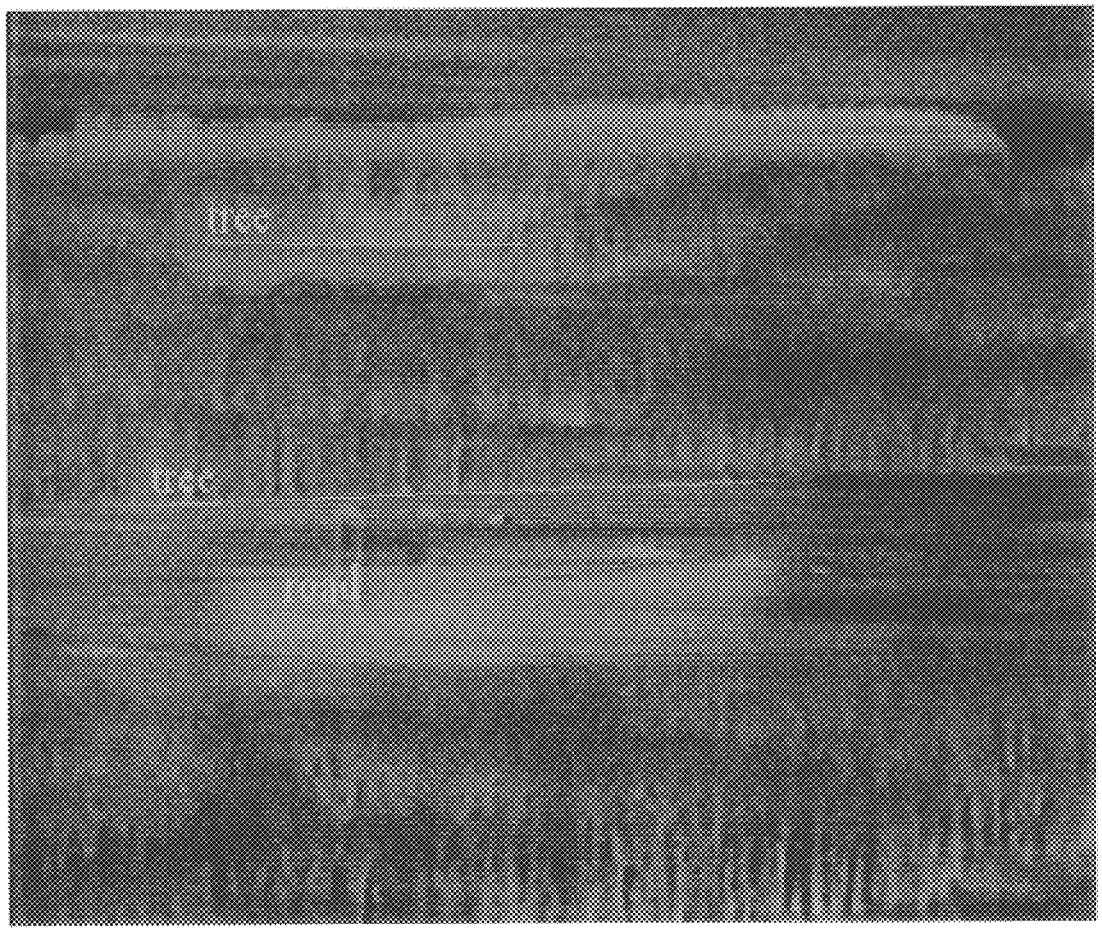
FIGS. 16a, 16b, 16c are three views of the same scene from different distances (6, 4 and 3 kilometers, respectively), illustrating the updating of the fuzzy confidence levels based upon user-input evidence.
Figure 16B:
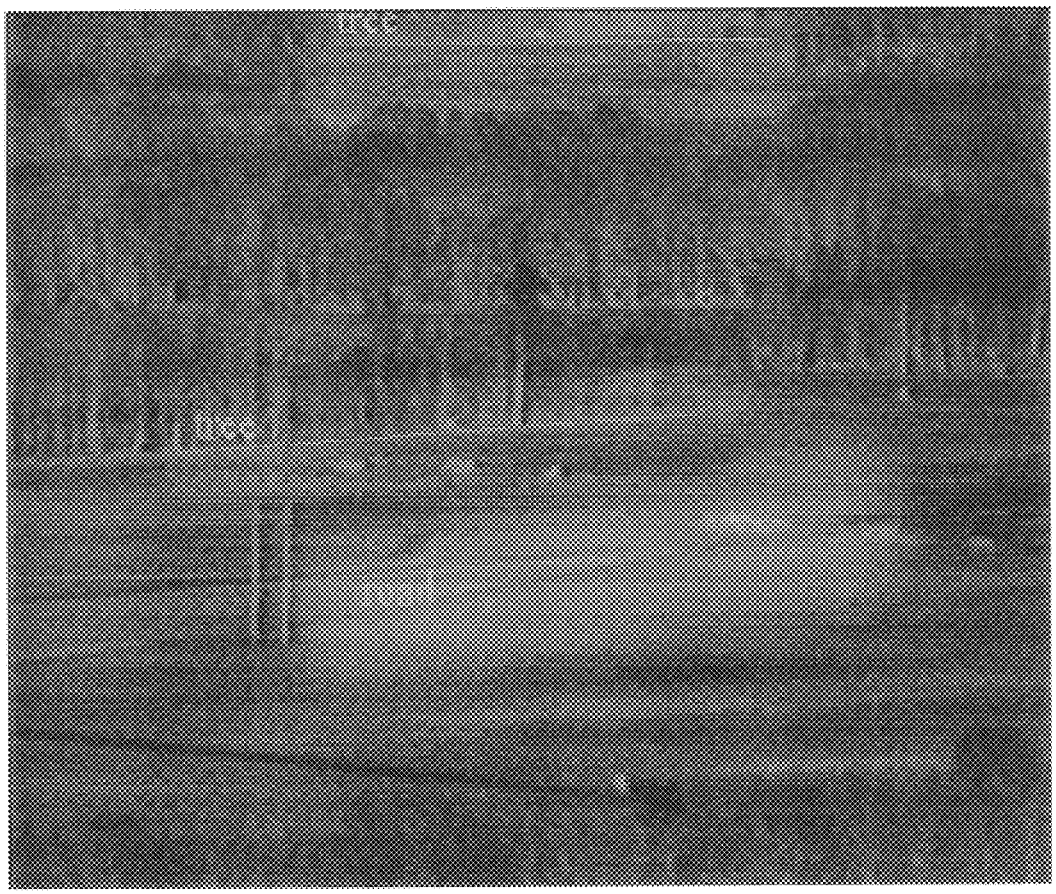
Figure 16C:
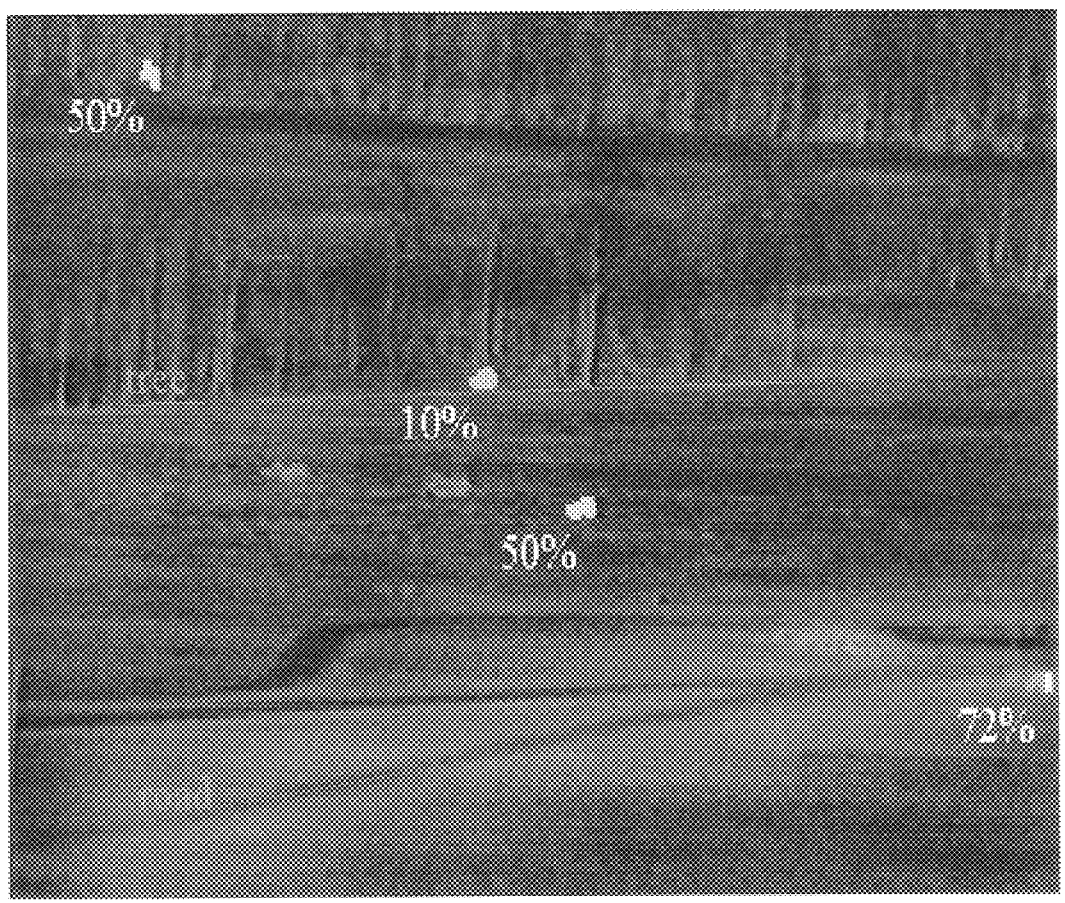

Up to this point, the concept has been demonstrated using stationary imagery. The idea can clearly be extended to video imagery, as the following emulation shows. FIG. 16*a* shows the scene in the image of FIG. 12*a* from a distance of six kilometers with evidence supplied by the user. As before, a user can add additional appropriate evidence and view the fuzzy confidence contours to ascertain areas of interest. As the user's viewpoint moves in closer, the user need not continuously reenter and update evidence; suitable tracking and prediction algorithms can perform that task. FIG. 16*b* shows the updated evidence at four kilometers. FIG. 16*c* is back to the original scene (at three kilometers).

Figure 17:
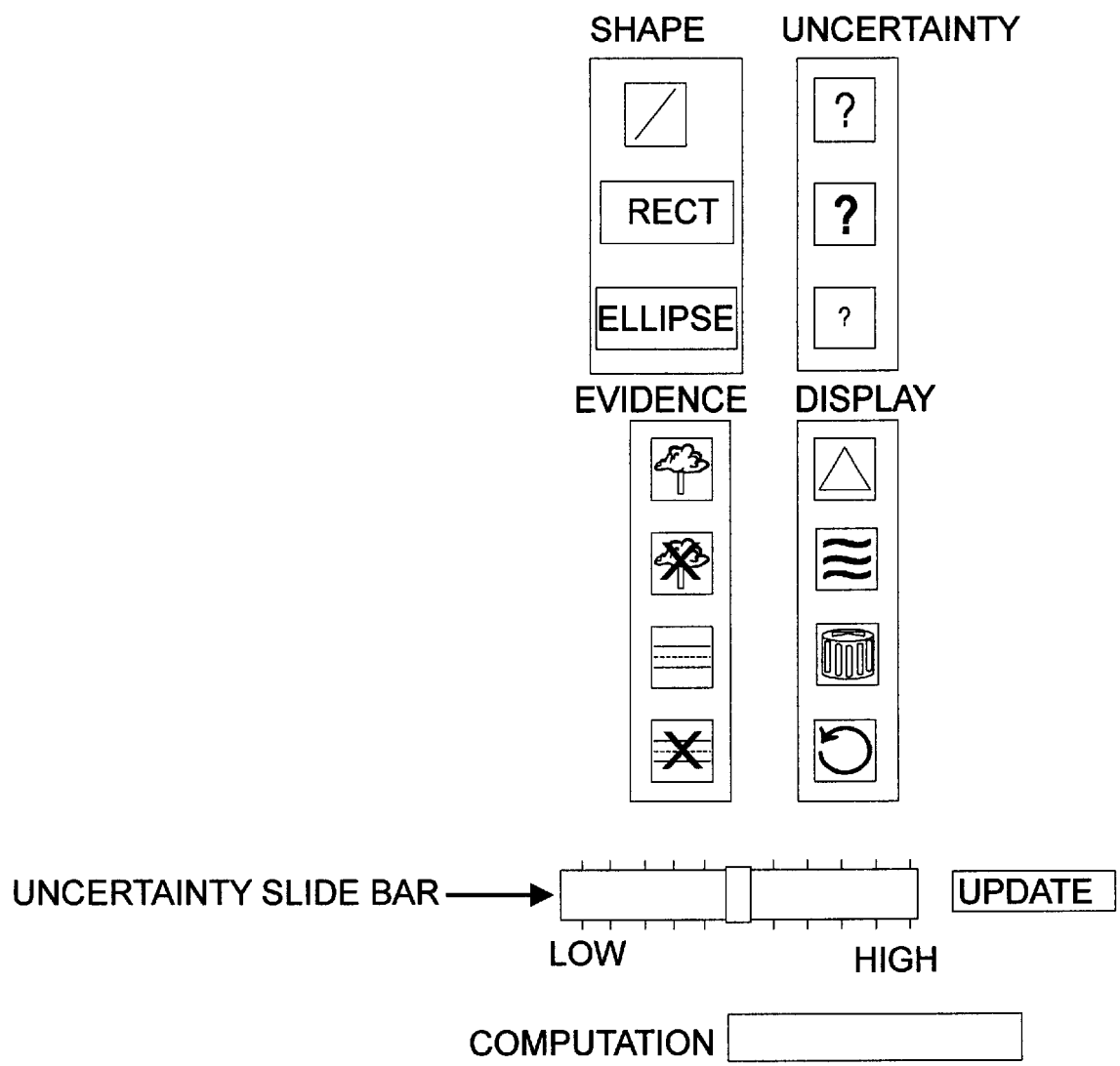
FIG. 17 is an alternative tool to that shown in FIG. 11, with the addition of a continuous uncertainty tuning option.
Figure 18A:
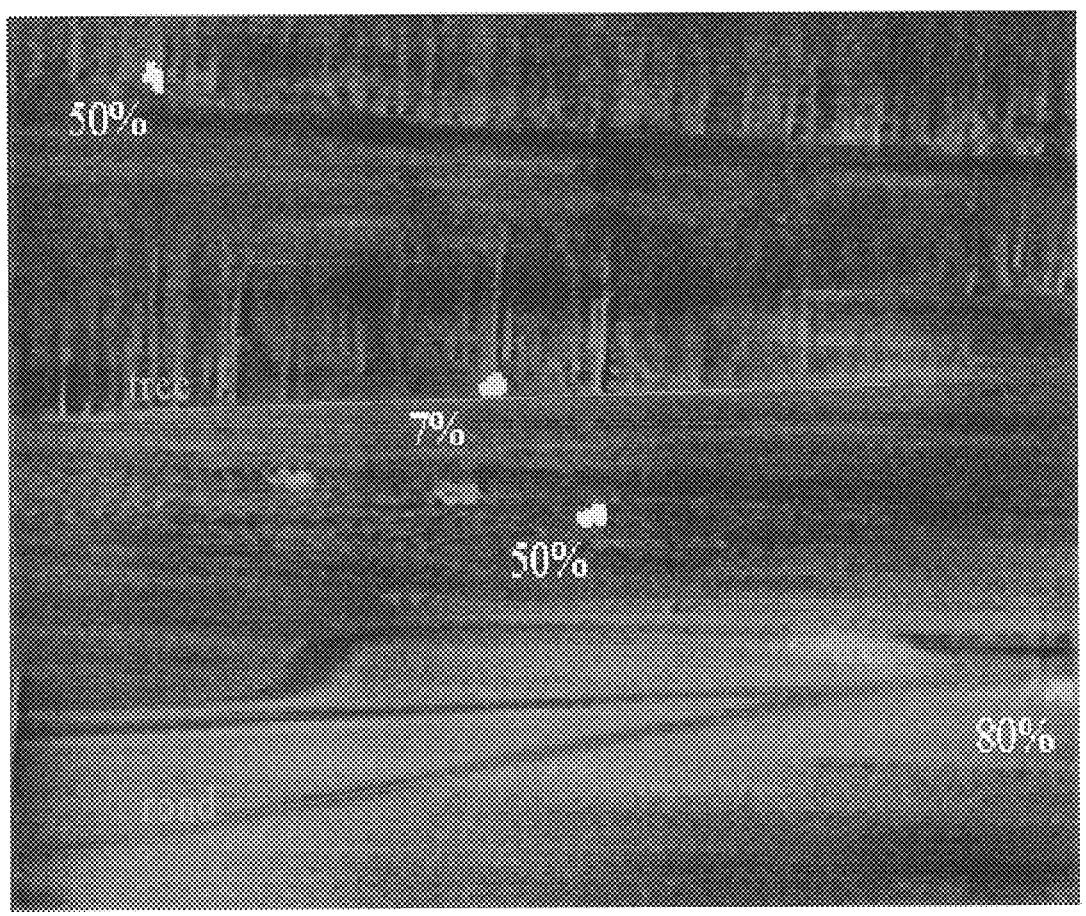
FIGS. 18a and 18b is an update to FIG. 16c, with the uncertainty level decreased.

A useful tool for a user in such case where motion is present is the ability to manually adjust the uncertainty level (analogous to turning a radio dial). See FIG. 17, which shows a continuously-adjustable uncertainty level using a slider bar (vs. selection of the "typical", "broad", and "narrow" uncertainty via the question mark buttons). This adjusting will accordingly adjust the fuzzy confidence contours; see FIG. 18*a* and contrast with FIG. 16*c*. This sort of "tuning" of uncertainty offers more flexibility than the previous examples using more rigid alterations (a doubling or halving, for example) of uncertainty.

There exist a number of different input devices for the selection and inputting of evidence. These include a touch screen, click-and-point mouse, and voice. These devices can be tailored to the needs/desires of the user.

Figure 18B:
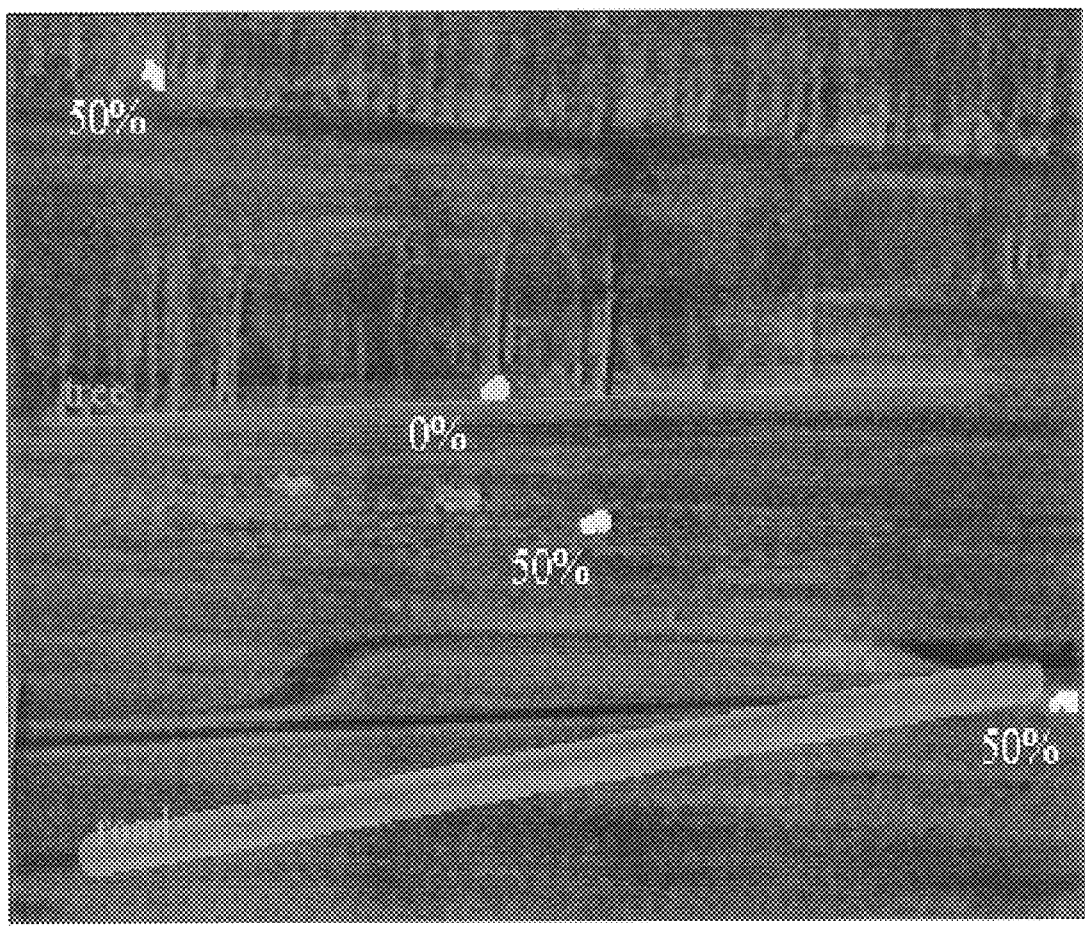

Finally, a contrast between a fuzzy logic-based approach and a crisp approach is shown. Consider FIG. 18b, which shows the confidence contours when crisp membership functions are used in the analysis. (That is, the membership functions take on values of either zero or one.) Fuzzy calculations permit degrees of confidence in prioritizing potential objects whereas the crisp case tends to produce extreme values. Fuzziness tends to manifest itself in continuous values, while crispness typically takes on discrete values. Crispness can unwarranted impressions of optimism or pessimism in a object. In FIG. 18b, the object near the road in the lower right corner is assigned a confidence value of 50%, putting it on equal footing with the other two objects not near the (blue) treeline. Thus a user may select these other two lacking any other reason to choose the lower right object. Fuzzy logic can break such ties by allowing a greater range of uncertainty to be represented.

Figure 19:
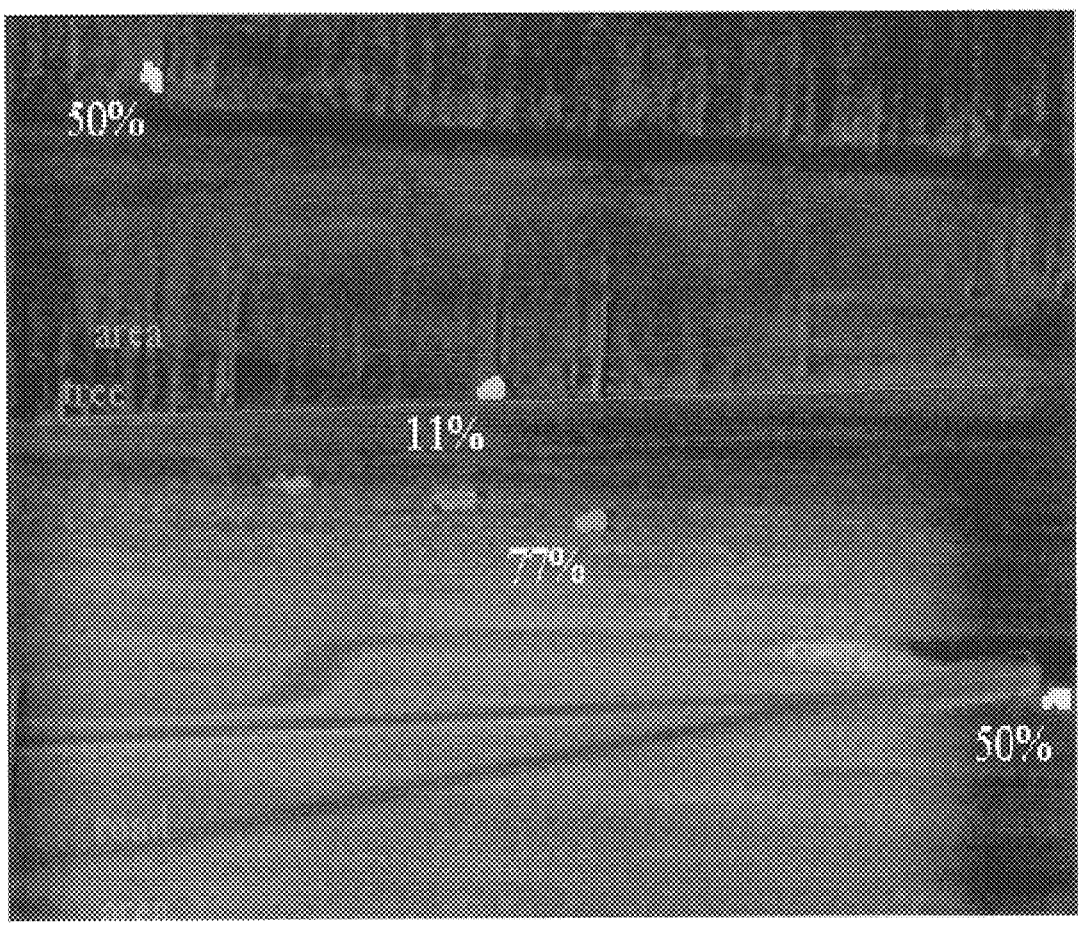
FIG. 19 shows confidence contours arising from a situation containing fuzzy-valued treelines, crisp-valued excluded regions, fuzzy-valued included regions, and crisp-valued roads.

Of course, there may be situations where there is some degree of certainty regarding some pieces of evidence, and the described methodology can easily incorporate such situations. FIG. 19 shows how fuzziness and crispness can be mixed in the same situation. Here we show the confidence contours arising from a situation containing fuzzy treelines, crisp excluded regions, fuzzy included regions, and crisp roads. From the mission planner standpoint, known (crisp) and less well known (fuzzy) types of evidence can be mixed and matched in designing appropriate tools. The developer of the underlying mechanisms of such tools can hold some pieces of evidence constant (crisp) while evolving the fuzzy membership functions of other pieces and types of evidence.

Figure 20A:
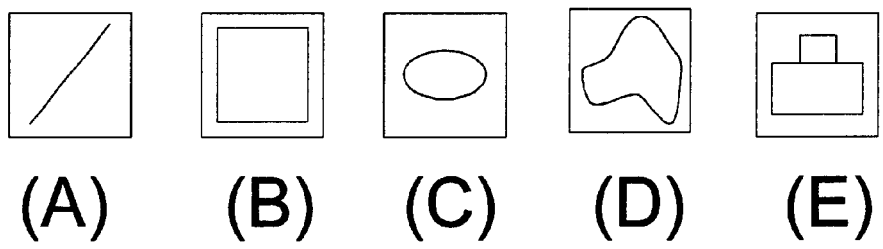
FIG. 20a shows examples of shapes which can be used to outline evidence imagery.

FIG. 20a shows geometric shapes used to outline evidence imagery. In (a), the button allows a user to enter a line onto the image to highlight a piece of evidence, such as a tree line or road. In (b), the button allows a user to enter a rectangular region into the image to highlight a piece of rectangular evidence such as an area of exclusion. In (c), the button allows the user to enter an ellipse into the image to highlight a piece of circular/elongated evidence. In (d), the button allows a user to enter a freehand shaped object into the image to highlight a piece of evidence with arbitrary or random shape, such as a lake. In (e), the button allows a user to enter a template shaped object into the image to highlight a piece of evidence that has a special form or shape.

Figure 20B:
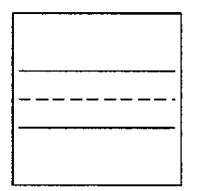
Figure 20B:
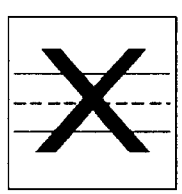
Figure 20B:
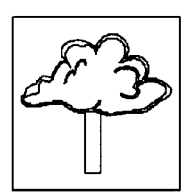
Figure 20B:
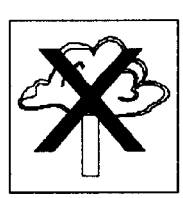
Figure 20B:
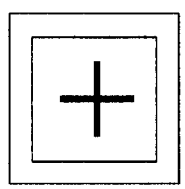
Figure 20B:
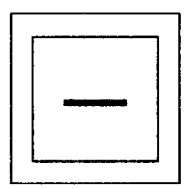
Figure 20B:
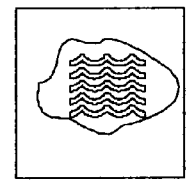

FIG. 20b shows different types of evidence corresponding to previously indicated geometric shapes. In (a), the button labels a piece of evidence as a road with high confidence that a selected object on or near this road is a target; i.e., it is "good" for an object to be near a road. Example (b), is the same as (a) except that the confidence is low, i.e., a target is not likely to be near a road. In (c), the button labels a piece of evidence as a tree line with high confidence that a nearby selected object is a target. Example (d) is the same as (c) except that the confidence is low. In (e) the button labels a rectangular or elliptical piece of evidence with high confidence that selected objects in the region are possible targets. Example (f) is the same as (e) except that the confidence is low that the region contains possible targets. In (g), the button labels a piece of evidence as lake.

Figure 20C:
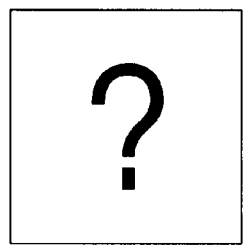
FIG. 20c shows buttons which can be included in the user tool to allow the user to activate different levels of uncertainty.
Figure 20C:
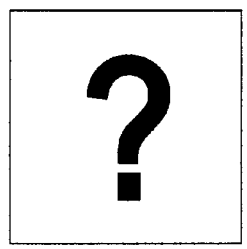
Figure 20C:
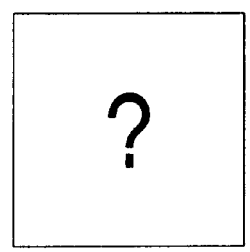

FIG. 20c shows a button to activate different levels of uncertainty. In (a), the button sets the amount of uncertainty to typical or optimum (e.g., through evolutionary computation). In (b), the button sets the amount of uncertainty to maximum (e.g., to twice as much uncertainty as "typical"). In (c), the button sets the amount of uncertainty to minimum (e.g., to half the uncertainty of "typical").

Figure 20D:
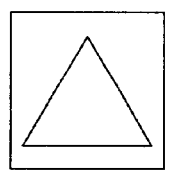
FIG. 20d shows several utilities for the user tool, to allow the user to control the amount of information in the image.
Figure 20D:
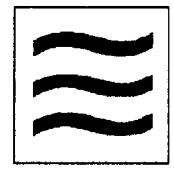
Figure 20D:
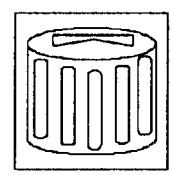
Figure 20D:
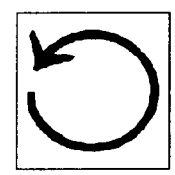
Figure 21A:
FIGS. 21a, 21b, 21c, 21d, 21e and 21f are exemplary images of the optimal display system/image overlay system of FIG. 8.
Figure 21B:
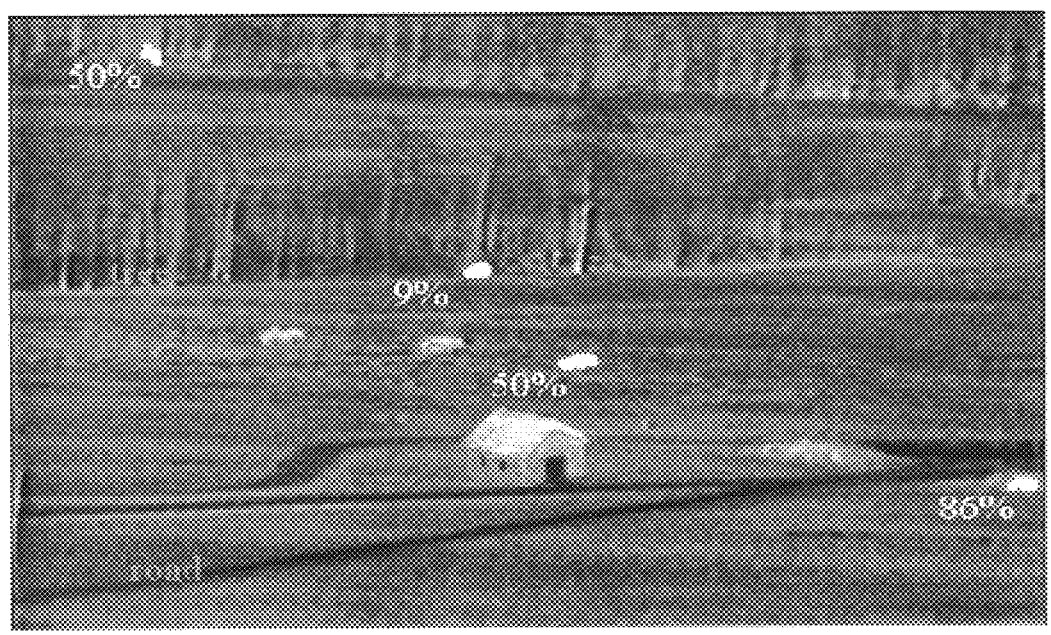
Figure 21C:
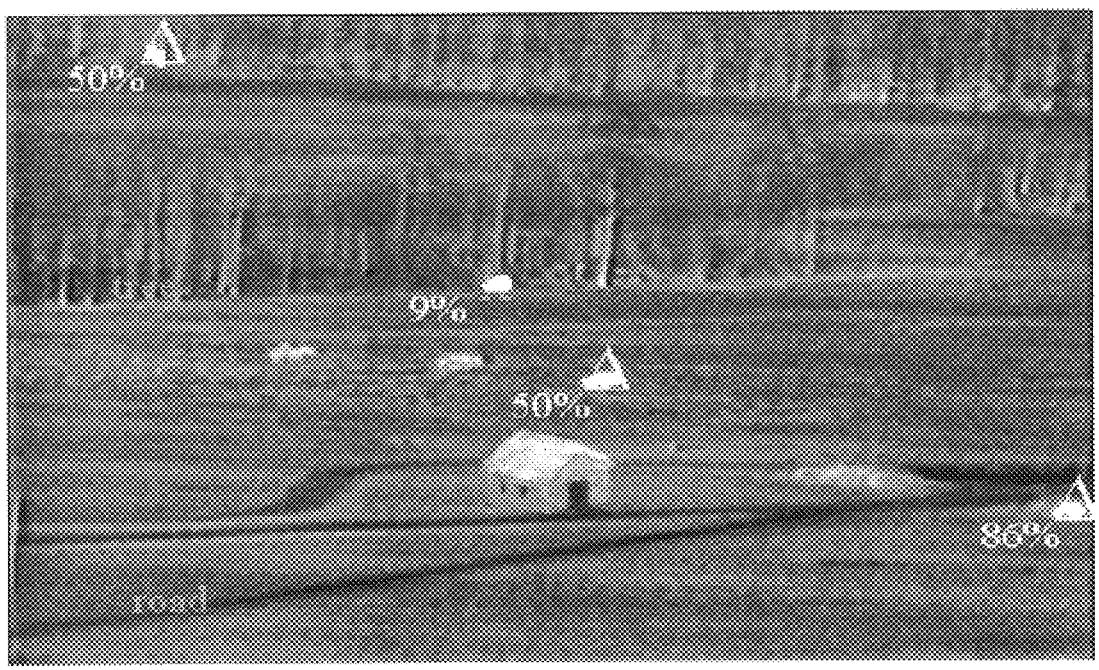
Figure 21D:
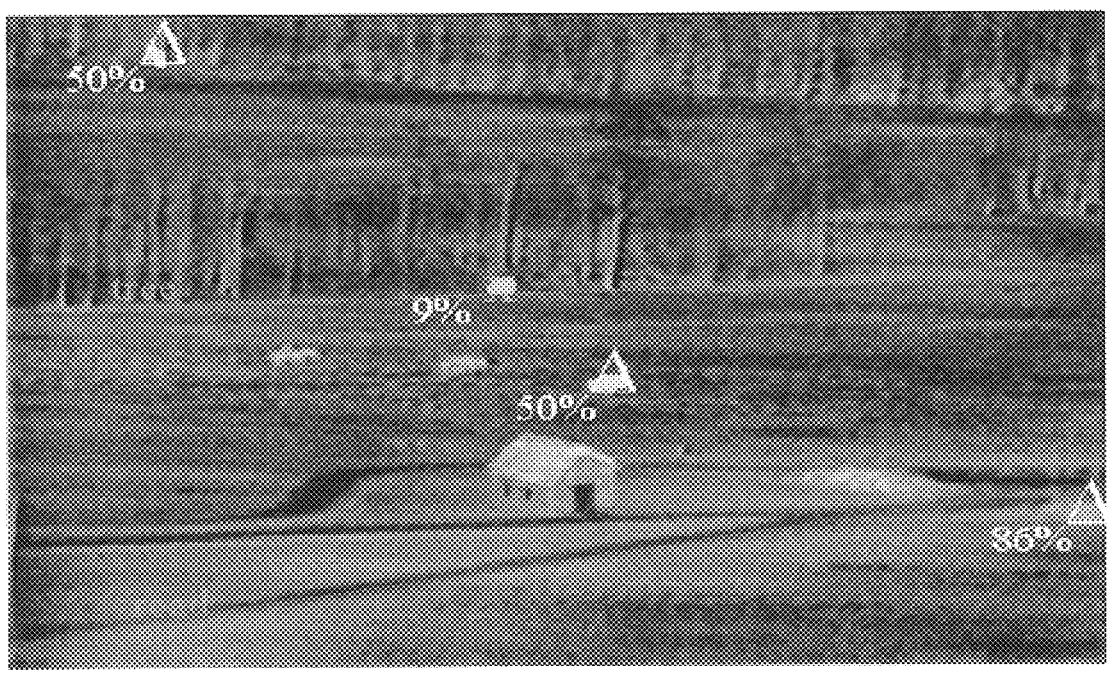
Figure 21E:
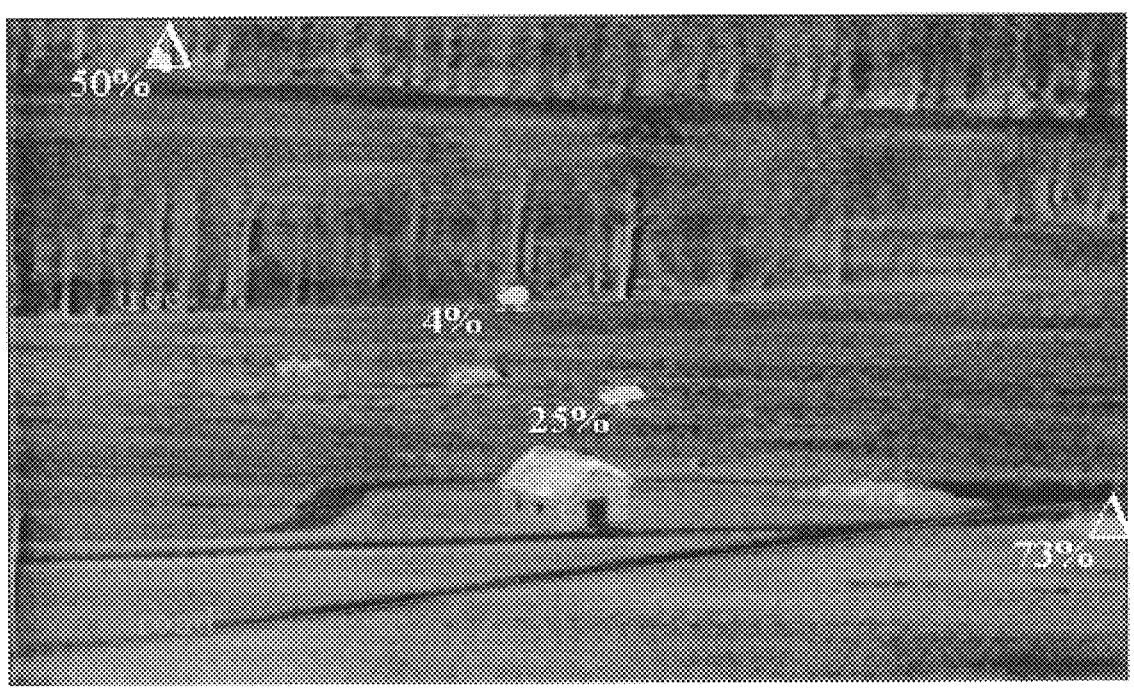
Figure 21F:
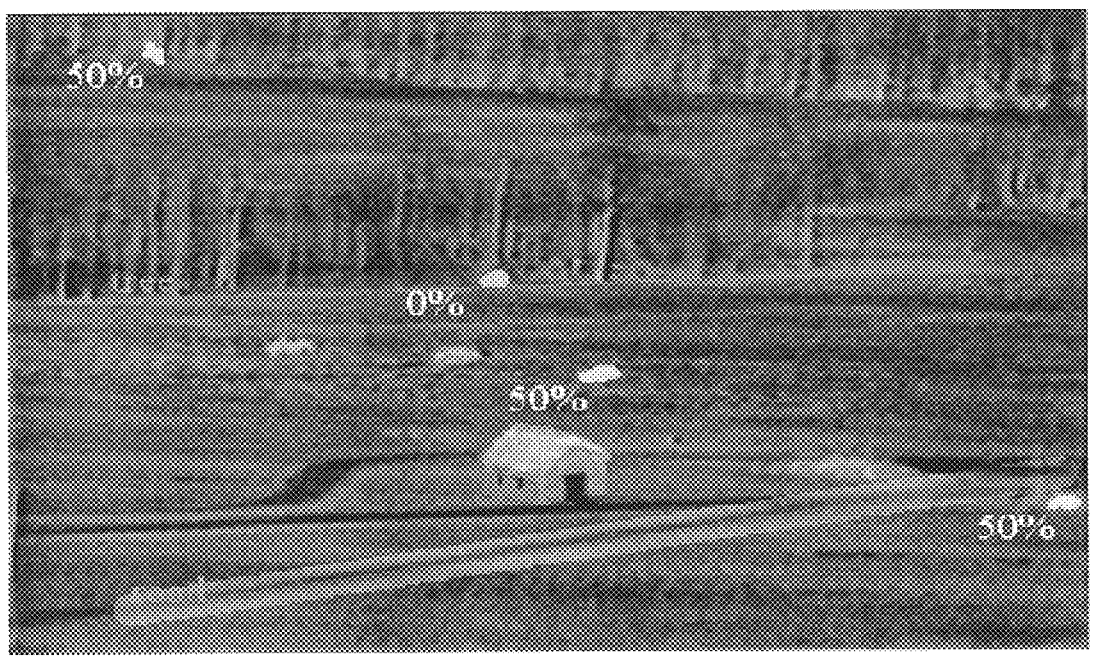
Figure 22:
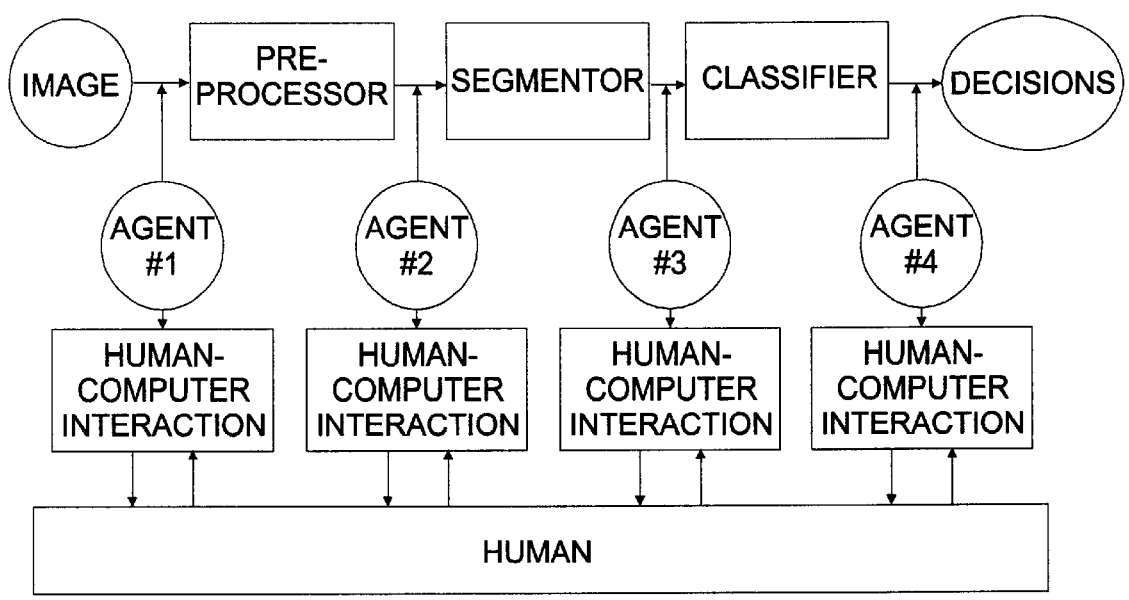
FIG. 22 is a block diagram of a generalized fuzzy logic-based man-AOD system of this invention, using a three-stage AOD.

FIG. 20d shows miscellaneous utilities, to allow the user to control the amount of information in the image. In (a), the button allows the user to toggle (on/off) the auto-target selection feature, which places a triangle around targets (on objects with confidence greater than or equal to 50%) and an X through non-target objects. In (b), the button allows the user to toggle (on/off) the contours, which highlight regions of increasing/decreasing confidence in target presence. In (c), the button deletes all pieces of evidence from the image. In (d), the button allows the user to undo the last action that removed evidence.

Accordingly, the present invention is intended to cover all such alternatives, modifications, and equivalents as may be included within the spirit and broad scope of the invention as defined only by the hereafter appended claims.

What is claimed is:

1. A method to use contextual information (location and characteristics of one or more "context objects") to automatically calculate, at one or more image locations the confidence ("target confidence") that any object located at such a location is an object of interest ("target object") in order to enhance the ability of a human or an automated object detector (AOD) system to detect and/or evaluate the presence, type, and location of target objects in an image.

2. The method of claim 1, wherein imagery is defined as multi-dimensional sensor and non-sensor data, often associated with a two-dimensional display, intended for visual interpretation by a human or for automatic processing by an AOD.

3. The method of claim 1, wherein the "sphere of influence" of context objects (locations in the image where the impact of the context object on target confidence, as a function of distance, is non-zero or above some threshold) can be one-, two-, or three-dimensional.

4. The method of claim 3, wherein the sphere of influence is defined by a fuzzy logic membership function used to calculate target confidence.

5. The method of claim 3, wherein the sphere of influence is defined by a probability distribution function to calculate target confidence.

6. The method of claim 3, wherein genetic algorithms are used to optimize the sphere of influence of a context object.

7. The method of claim 1, wherein fuzzy logic and/or fuzzy set theory is used to combine context information from one or more context objects, to determine target confidence at said locations in said imagery.

8. The method of claim 1, wherein a context object's influence on target confidence, as a function of distance from the object, is also a function of target object type.

9. The method of claim 1, wherein a context object's influence on target confidence, as a function of distance from the object, takes into account known and potentially time varying errors in the sensors used to determine said distances.

10. The method of claim 1, wherein a context object's influence on target confidence, as a function of distance from the object, takes into account errors incurred when incorporating the context objects into imagery.

11. The method of claim 1, which calculates target confidence at specific image locations identified by an AOD as likely to contain targets.

12. The method of claim 1, which evaluates imagery and supplements it with context object information that an AOD can use to alter the AOD's probability of detecting targets, according to each image location's target confidence.

13. The method of claim 1, which evaluates imagery and supplements it with context object information that an AOD can use to alter the AOD's probability of detecting targets, according to each image location's target confidence; sends the imagery and information to an AOD; and reports target confidence at the image locations where the AOD detects targets.

14. The method of claim 1, wherein said context information is stored in a database.

15. The method of claim 1, wherein said context information is encoded to include time dependencies of context object size, shape, and location, and automatically updated to account for said time dependencies.

16. The method of claim 1, wherein said context information is determined by a human from imagery from one or more sources.

17. The method of claim 1, wherein said context information is determined automatically by a computer system from imagery from one or more sources.

18. The method of claim 1, wherein said context information is entered by a human onto one or more displays of imagery.

19. The method of claim 1, wherein said context information is input by a human using a display consisting of a plurality of pre-defined menu tables.

20. The method of claim 1, wherein said context information is input by a human using a graphical user interface.

21. The method of claim 1, wherein said context information is entered by a human by specifying numerical coordinates of the context object.

22. The method of claim 1, wherein said context information can be transmitted to and/or received from a remote system.

23. The method of claim 1, wherein the human can manually change the size, shape, and/or location of a context object's sphere of influence.

24. The method of claim 1, which displays overlays of contextual information, target confidence, and any available AOD output onto imagery, in order to enhance the ability of a human to detect and/or evaluate the presence, type, and location of target objects in an image.

25. The method of claim 24, wherein one or more images are so overlaid, and each displayed on a separate physical display.

26. The method of claim 24, wherein said overlay indicates the location, target type, and target confidence associated with one or more targets.

27. The method of claim 26, wherein said overlay identifies each target object location by overlaying a symbol at each such location.

28. The method of claim 27, wherein said symbol is a different shape for each type of target object or set of types.

29. The method of claim 27, wherein said symbol is a different shape or no symbol at all, for each of various levels of target confidence.

30. The method of claim 27, wherein said symbol is a different color for each of various levels of target confidence.

31. The method of claim 26, wherein text displayed near target objects identifies target type and/or target confidence for those objects.

32. The method of claim 24, wherein said overlay indicates the target confidence at each location in said image.

33. The method of claim 32, wherein said overlay of target confidence uses different colors, for different influences (including positive and negative) on target confidence respectively, with intensity of the color at each location proportional to influence at that location.

34. The method of claim 24, wherein a context object is used as a placeholder to which the human can return after searching an image.

35. The method of claim 24, wherein a context object of known size is used as a yardstick, allowing the human to better understand spatial relationships in the image, including determination of size and distances of context objects and targets in an image.

36. The method of claim 24, wherein a context object can be used as a reference point (spotlight/flashlight) to highlight regions of interest in the image.

37. The method of claim 24, wherein the display is automatically updated to account for any changing perspective of the image; any manual or time-dependent changes in size, shape, and location of context information; any resulting changes in target confidence; and changes in any available output of the AOD.

* * * * *

UNITED STATES PATENT AND TRADEMARK OFFICE
CERTIFICATE OF CORRECTION

PATENT NO.    : 6,578,017 B1
DATED         : June 10, 2003
INVENTOR(S)   : John Franklin Ebersole and John Franklin Ebersole, Jr.

It is certified that error appears in the above-identified patent and that said Letters Patent is hereby corrected as shown below:

<u>Title page,</u>
Item [75], Inventor, change "Bedford, OH (US)" to -- Bedford, NH (US) --.

Signed and Sealed this

Sixth Day of January, 2004

JAMES E. ROGAN
*Director of the United States Patent and Trademark Office*